United States Patent
Wu et al.

(10) Patent No.: US 12,333,759 B2
(45) Date of Patent: Jun. 17, 2025

(54) IDENTIFYING A POSITION OF A CONTROLLABLE DEVICE USING A WEARABLE DEVICE

(71) Applicant: Google LLC, Mountain View, CA (US)

(72) Inventors: Shengzhi Wu, Shenzhen (CN); Alexander James Faaborg, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/246,464

(22) PCT Filed: Nov. 16, 2020

(86) PCT No.: PCT/US2020/070792
§ 371 (c)(1),
(2) Date: Mar. 23, 2023

(87) PCT Pub. No.: WO2022/103420
PCT Pub. Date: May 19, 2022

(65) Prior Publication Data
US 2023/0360264 A1     Nov. 9, 2023

(51) Int. Cl.
*G06T 7/73*       (2017.01)
*G06F 3/04815*  (2022.01)
(Continued)

(52) U.S. Cl.
CPC ............ *G06T 7/74* (2017.01); *G06F 3/04815* (2013.01); *G06F 3/0484* (2013.01); *G06T 15/00* (2013.01); *G06V 20/20* (2022.01); *G06T 2200/24* (2013.01)

(58) Field of Classification Search
CPC ....... G06T 7/74; G06T 15/00; G06T 2200/24; G06F 3/04815; G06F 3/0484;
(Continued)

(56) References Cited

U.S. PATENT DOCUMENTS 8,717,388 B2 *  5/2014  Matsuda ................. G06F 3/017
                                                         345/633
9,477,302 B2   10/2016  Kauffmann et al.
(Continued)

FOREIGN PATENT DOCUMENTS

CN     110413719 A    11/2019
CN     111512119 A     8/2020
(Continued)

OTHER PUBLICATIONS

International Search Report and Written Opinion for International Application No. PCT/US2019/014937, mailed Jun. 21, 2019, 14 pages.

(Continued)

*Primary Examiner* — Grant Sitta
(74) *Attorney, Agent, or Firm* — Brake Hughes Bellermann LLP

(57) ABSTRACT

According to an aspect, a method of identifying a position of a controllable device includes receiving visual data from an image sensor on a wearable device, generating, by an object recognition module, identification data based on the visual data, and identifying, using the identification data, a first three-dimensional (3D) map from a map database that stores a plurality of 3D maps including the first 3D map and a second 3D map, where the first 3D map is associated with a first controllable device and the second 3D map is associated with a second controllable device. The method includes obtaining a position of the first controllable device in a physical space based on visual positioning data of the first 3D map and rendering a user interface (UI) object on a display in a position that is within a threshold distance of the position of the first controllable device.

16 Claims, 19 Drawing Sheets

(51) Int. Cl.
*G06F 3/0484* (2022.01)
*G06T 15/00* (2011.01)
*G06V 20/20* (2022.01)

(58) Field of Classification Search
CPC .......... G06F 3/011; G06F 1/163; G06F 3/048; G06V 20/20; G02B 2027/0138; G02B 2027/014; G02B 27/0172; G06Q 50/10
See application file for complete search history.

(56) References Cited

U.S. PATENT DOCUMENTS

| | | | | |
|---|---|---|---|---|
| 10,345,913 | B2* | 7/2019 | Jain | G06F 3/0486 |
| 10,701,661 | B1 | 6/2020 | Coelho et al. | |
| 2004/0121725 | A1 | 6/2004 | Matsui | |
| 2009/0054108 | A1* | 2/2009 | Kito | G06F 3/04883 455/566 |
| 2009/0244015 | A1* | 10/2009 | Sengupta | G06F 3/04883 345/173 |
| 2011/0312311 | A1* | 12/2011 | Abifaker | H04M 1/72415 455/418 |
| 2014/0249657 | A1 | 9/2014 | Yurasits et al. | |
| 2015/0070319 | A1 | 3/2015 | Pryor | |
| 2016/0148417 | A1* | 5/2016 | Kim | G06F 3/14 345/419 |
| 2016/0252967 | A1 | 9/2016 | Liang et al. | |
| 2016/0283205 | A1 | 9/2016 | Chen et al. | |
| 2016/0320934 | A1 | 11/2016 | Thomason | |
| 2017/0162036 | A1 | 6/2017 | Agardh et al. | |
| 2018/0143432 | A1 | 5/2018 | Li et al. | |
| 2018/0151060 | A1 | 5/2018 | Griffin | |
| 2018/0157398 | A1* | 6/2018 | Kaehler | G06T 19/006 |
| 2018/0275762 | A1 | 9/2018 | Freeman et al. | |
| 2018/0285052 | A1* | 10/2018 | Eade | B65G 1/0492 |
| 2018/0322774 | A1 | 11/2018 | Wang et al. | |
| 2019/0179509 | A1* | 6/2019 | Daie | G06F 3/04815 |
| 2019/0235641 | A1* | 8/2019 | Goldberg | G06F 3/0482 |
| 2019/0302714 | A1* | 10/2019 | Laurent | H04L 12/282 |
| 2019/0311544 | A1* | 10/2019 | Kayo | H04L 67/131 |
| 2019/0340836 | A1 | 11/2019 | Lynen et al. | |
| 2020/0142388 | A1* | 5/2020 | Maggiore | H04W 4/022 |
| 2020/0322178 | A1* | 10/2020 | Wang | H04W 4/021 |
| 2022/0083631 | A1* | 3/2022 | Chen | G01C 21/365 |

FOREIGN PATENT DOCUMENTS

| | | |
|---|---|---|
| JP | 2011164666 A | 8/2011 |
| JP | 2015213212 A | 11/2015 |
| JP | 2016533565 A | 10/2016 |
| JP | 2020513618 A | 5/2020 |
| JP | 2020098451 A | 6/2020 |
| JP | 2020135679 A | 8/2020 |
| TW | 201926992 A | 7/2019 |
| TW | M584455 U | 10/2019 |
| WO | 2016192916 A1 | 12/2016 |
| WO | 2017201162 A1 | 11/2017 |
| WO | 2018005061 A1 | 1/2018 |

OTHER PUBLICATIONS

International Search Report and Written Opinion for PCT Application No. PCT/US2020/070792, mailed on Aug. 4, 2021, 12 pages.
Office Action for Taiwanese Application No. 110142337 (with English Translation), mailed Jul. 28, 2022, 17 pages.
Heun, et al., "Smarter Objects: Using AR Technology To Program Physical Objects and Their Interactions", CHI 2013: Changing Perspectives, 2013, pp. 961-966.
First Office Action (with English translation) for Chinese Application No. 202080106474.8, mailed on Sep. 4, 2024, 29 pages.
Notice of Allowance for Japanese Application No. 2023-528595 (with English translation), mailed Nov. 12, 2024, 6 pages.

* cited by examiner

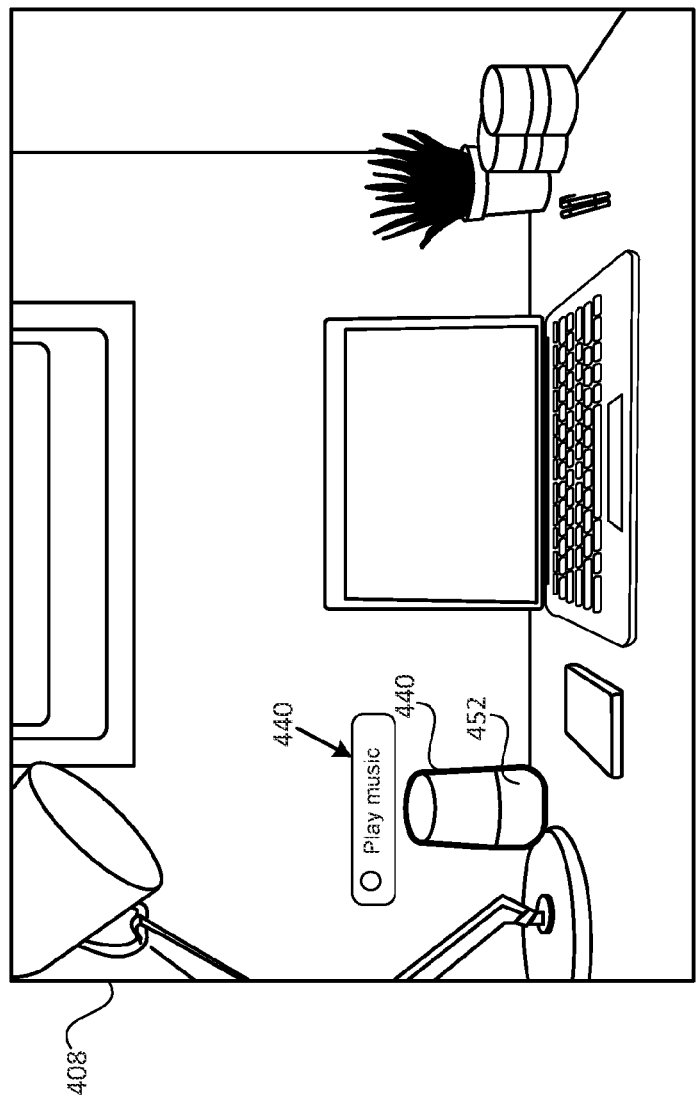

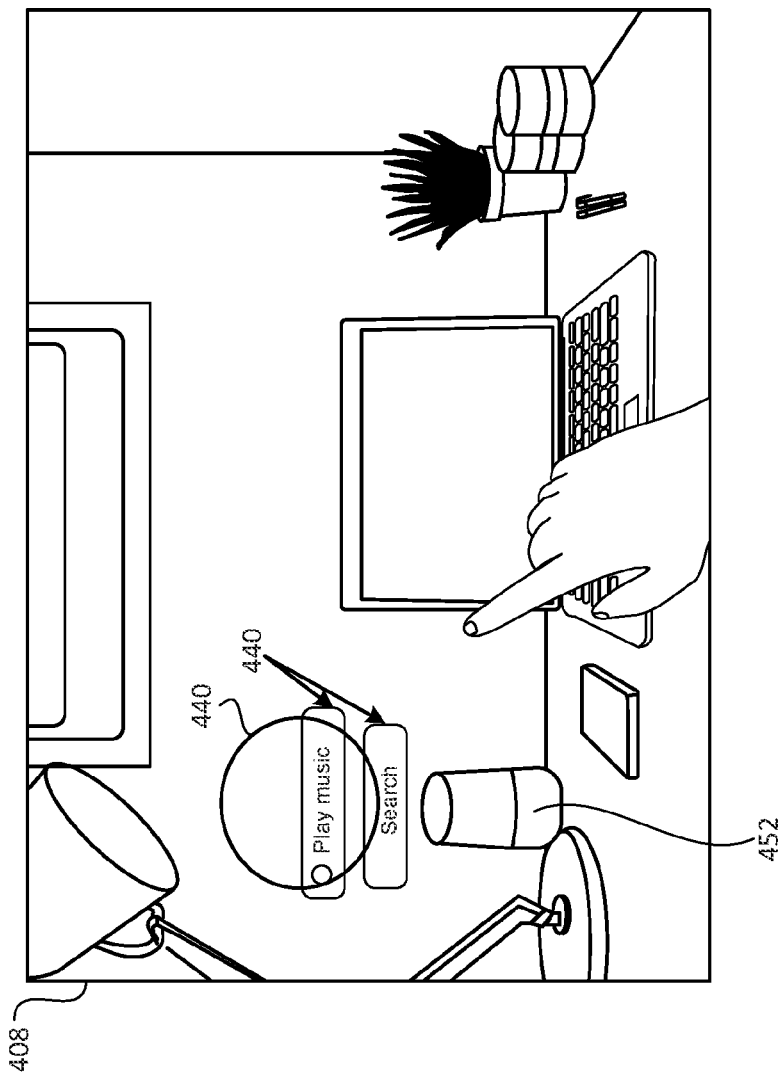

IDENTIFYING A POSITION OF A CONTROLLABLE DEVICE USING A WEARABLE DEVICE

CROSS-REFERENCE TO RELATED APPLICATION

This application is a 35 U.S.C. § 371 National Phase Entry Application from PCT/US2020/070792, filed on Nov. 16, 2020, entitled "IDENTIFYING A POSITION OF A CONTROLLABLE DEVICE USING A WEARABLE DEVICE", the disclosure of which is incorporated herein by reference in its entirety.

TECHNICAL FIELD

This description generally relates to obtaining a position of a controllable device using a wearable device.

BACKGROUND

A wearable device may be used to control one or more controllable devices such as media streaming devices, home speakers, smart light bulbs, etc. In some examples, a wearable device includes a camera that captures visual data and image recognition software to process the image data to detect a device in the field of view of the wearable device's camera, which can obtain a two dimensional (2D) position of the device. However, the 2D position may not be sufficient to render user interface (UI) controls on a display of the wearable device in a position that is proximate to the position of the device in 3D space so that the user can control the device with an interactive UI or be presented with additional information about the device. In addition, according to some conventional techniques, if the user has multiple, similar looking devices (e.g., two smart light bulbs that look the same), the wearable device may not be able to distinguish between the multiple devices in order to control the device that is intended by the user.

SUMMARY

According to an aspect, a method of identifying a position of a controllable device using a wearable device includes receiving visual data from an image sensor on a wearable device, generating, by an object recognition module, identification data based on the visual data, and identifying, using the identification data, a first three-dimensional (3D) map from a map database that stores a plurality of 3D maps including the first 3D map and a second 3D map, where the first 3D map is associated with a first controllable device and the second 3D map is associated with a second controllable device. The method includes obtaining a position of the first controllable device in a physical space based on visual positioning data of the first 3D map and rendering a user interface (UI) object on a display of the wearable device in a position that is within a threshold distance of the position of the first controllable device. In some examples, the UI object is rendered on the display at a position that corresponds to the position of the first controllable device.

According to some aspects, the method may include one or more of the following features (or any combination thereof). The position includes a six degree of freedom position of the controllable device. The identification data may include at least one of a device name or a device type of the first controllable device. The identification data may include a space type of the physical space associated with the first controllable device. The identification data is stored in association with the first 3D map in the map database. The method may include comparing the visual data against the first 3D map. The method may include generating the first 3D map during a setup procedure associated with the first controllable device. The first 3D map may include a feature point map corresponding to a virtual cloud anchor, and the virtual cloud anchor is configured to be shared with one or more other users. The UI object may include one or more controls that permits a user to control the first controllable device.

According to an aspect, a non-transitory computer-readable medium storing executable instructions that when executed by at least one processor are configured to cause the at least one processor to receive visual data from an image sensor on a wearable device, generate, by an object recognition module, identification data based on the visual data, identify, using the identification data, a first three-dimensional (3D) map from a map database that stores a plurality of 3D maps including the first 3D map and a second 3D map, where the first 3D map is associated with a first controllable device, and the second 3D map is associated with a second controllable device, obtain a position of the first controllable device in a physical space at least partially represented by the visual data based on visual positioning data of the first 3D map, and render a user interface (UI) object on a display of the wearable device in a position that is within a threshold distance of the position of the first controllable device, where the UI object includes one or more interactive controls to control the first controllable device. In some examples, the UI object is rendered on the display at a position that corresponds to the position (e.g., the 6 DoF position) of the first controllable device.

According to some aspects, the non-transitory computer-readable medium may include one or more of the above/below features (or any combination thereof). The map database may be stored at a server computer. The executable instructions, when executed by the at least one processor, may be configured to cause the at least one processor to communicate with the server computer to access the map database. The map database may be stored at the wearable device or a computing device communicatively coupled to the wearable device. The executable instructions, when executed by the at least one processor, may be configured to cause the at least one processor to communicate with the wearable device or the computing device, respectively, to access the map database. The identification data may include at least one of a device name, a device type, or a space type associated with the first controllable device. The executable instructions may include instructions that cause the at least one processor to generate the first 3D map during a setup procedure associated with the first controllable device and generate the second 3D map during a setup procedure associated with the second controllable device. The first 3D map may include a feature point map corresponding to a virtual cloud anchor, where the virtual cloud anchor is configured to be shared with one or more other users.

According to an aspect, a computing system for identifying a position of a controllable device may include an image sensor configured to receive visual data, an object recognition module configured to generate identification data based on the visual data, a position identifier configured to identify, using the identification data, a first three-dimensional (3D) map from a map database that stores a plurality of 3D maps including the first 3D map and a second 3D map, the first 3D map being associated with a first controllable device, the second 3D map being associated with a second controllable device, and the position identifier is configured to obtain a position of the first controllable device in a physical space based on visual positioning data of the first 3D map, and a user interface (UI) object renderer configured to render a UI object on a display of a wearable device in a position that is within a threshold position of the first controllable device. In some examples, the UI object is rendered on the display at a position that corresponds to the position of the first controllable device.

According to some aspects, the computing system may include one or more of the above/below features (or any combination thereof). The computing system may include the wearable device and a computing device, where the computing device is communicatively coupled to the wearable device via a wireless connection. The computing system may include the wearable device and the wearable device may include smartglasses. The map database may be stored in a memory device of the computing system. The map database may be stored in a memory device associated with a server computer. The computing system may include an antenna configured to transmit the identification data to the server computer in order to identify the first 3D map at the server computer, where the antenna is configured to receive the visual positioning data from the server computer.

The details of one or more implementations are set forth in the accompanying drawings and the description below. Other features will be apparent from the description and drawings, and from the claims.

BRIEF DESCRIPTION OF THE DRAWINGS

FIGS. 4A through 4D illustrate examples of rendering UI objects on a display of a wearable device according to an aspect.

DETAILED DESCRIPTION

Figure 1A:
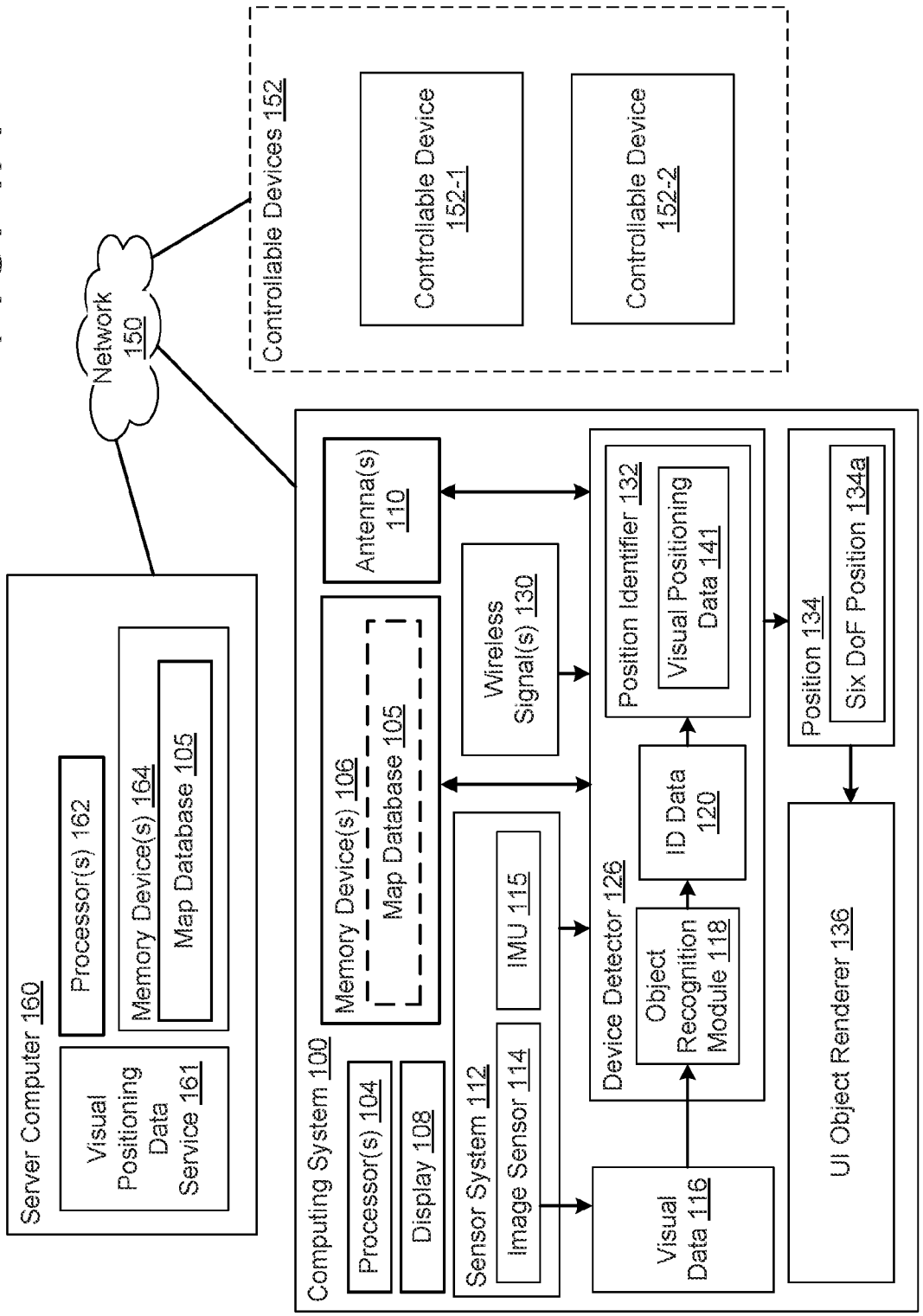
FIG. 1A depicts a computing system for identifying a position of a controllable device using visual data captured by an image sensor and three-dimensional (3D) maps according to an aspect.

This disclosure relates to a wearable device that captures visual data and identifies, based on the visual data, a pre-stored three-dimensional (3D) map (e.g., a 3D mesh, a 3D feature map, a virtual cloud anchor, etc.) from a map database, where the 3D map marks a location of a controllable device in a physical space that is at least partially represented by the visual data. The map database may store a plurality of 3D maps, where each 3D map includes visual positioning data about a separate controllable device. The map database may be stored locally or stored remotely on a server computer. The information from the 3D map is used to detect a six degree of freedom (DoF) position of the controllable device. Then, the wearable device can render a user interface (UI) object on a display of the wearable device at a location that is within a threshold distance of the position of the controllable device in 3D space. In some examples, the UI object is rendered on the display at a position that corresponds to the position (e.g., the six DoF position) of the controllable device. The UI object may provide the user with one or more controls to control the controllable device and/or additional information about the controllable device.

For example, during the setup of a first controllable device, a computing device (e.g., the wearable device or another type of device such as a smartphone) may be used to mark the location of the first controllable device. The user may point the computing device's image sensor at the first controllable device and move the device around to map the physical space from different viewing angles and positions to compute feature points of the first controllable device's surroundings.

In some examples, the feature points are transmitted to a server computer to generate a first 3D map, and the first 3D map is stored in the map database at the server computer. In some examples, the first 3D map is a feature point map. In some examples, the first 3D map is a virtual anchor that can be used to localize the captured scene for another user. The first 3D map is stored in association with identification data that includes information about the first controllable device. In some examples, the identification data includes a device type and/or device name of the first controllable device. In some examples, the identification data includes a space type that identifies the type of space (e.g., living room, bedroom, kitchen) in which the first controllable device is situated. For example, the server computer may analyze the feature points to determine which type of physical space is associated with the first controllable device (e.g., a bed in the room of the first controllable device may indicate that the first controllable device is in a bedroom), and the first 3D map is stored in association with the space type. In some examples, the computing device may generate and store the first 3D map locally using feature points or generally any type of 3D scanning technique.

The same operations may be applied during the setup of another controllable device. For example, during the setup of a second controllable device, a second 3D map is generated that identifies the location of the second controllable device. The second 3D map is stored in association with identification data that can identify the second controllable device.

After the setup procedure, the user may enter a physical space and use the wearable device's image sensor to capture visual data. In some examples, the wearable device includes an object recognition module that can determine the type of objects contained in the visual data. For example, if the first controllable device enters the field of view of the wearable device's image sensor, the object recognition module may analyze the visual data to determine the type of device. In some examples, the object recognition may analyze the visual data to detect the type of space in which the user is located, e.g., detection of a bed may indicate that the user is located in a bedroom. The object recognition module may generate identification data (e.g., device type, device name, space type etc.) that identifies the first controllable device and/or the physical space. The identification data generated by the object recognition module may be used to identify the appropriate 3D map from the map database. For example, if the first controllable device is a home speaker, the map database stores the first 3D map in association with the type of controllable device, e.g., home speaker. Then, when the user enters the room with the home speaker, and the wearable device's object recognition module detects a home speaker, the first 3D map is identified because the first 3D map has been annotated with the same identification data. In some examples, the wearable device transmits the identification data (derived by the object recognizer) to the server computer in order to identify which of the 3D maps stored in the map database.

Then, in order to determine that the identified first 3D map at least partially corresponds to a physical space represented by the visual data captured by the image sensor, the visual data is compared against the first 3D map to determine whether there is a match (e.g., involves the same physical space). In some examples, the comparison is performed at the server computer, and, if the comparison results in a match, the server computer returns a pose (e.g., position and orientation) of the first controllable device, which the wearable device uses to determine the wearable device's position and orientation relative to the first controllable device. In some examples, the comparison is performed locally. In some examples, the pose may be referred to as a six DoF position of the first controllable device. In some examples, the operation of comparing the visual data against a 3D map may be referred to as resolving a 3D map.

In some examples, instead of using an object recognition module to detect the type of device captured by the visual data (and then using the type of device to quickly identify a 3D map), the visual data may be continuously or periodically compared against the stored 3D maps in the map database in order to determine which 3D map corresponds to the visual data captured by the image sensor. When there is a match, the wearable device may obtain the six DoF position of a controllable device from the matching 3D map. However, in some examples, resolving a 3D map is computationally expensive, and if the map database includes a relatively large number of 3D maps, the processing power and/or time may be relatively large. In addition, the system would have to repeatedly (and/or continuously) compare incoming video data to the 3D maps, thereby decreasing the system's efficiency. However, by leveraging the information obtained by the object recognition module, the efficiency can improve (and the processing power and/or time may be reduced) by resolving fewer 3D maps (e.g., the ones associated with recognized devices) for a relatively small number of frames (versus continuously comparing the visual database against the 3D maps).

Figure 1B:
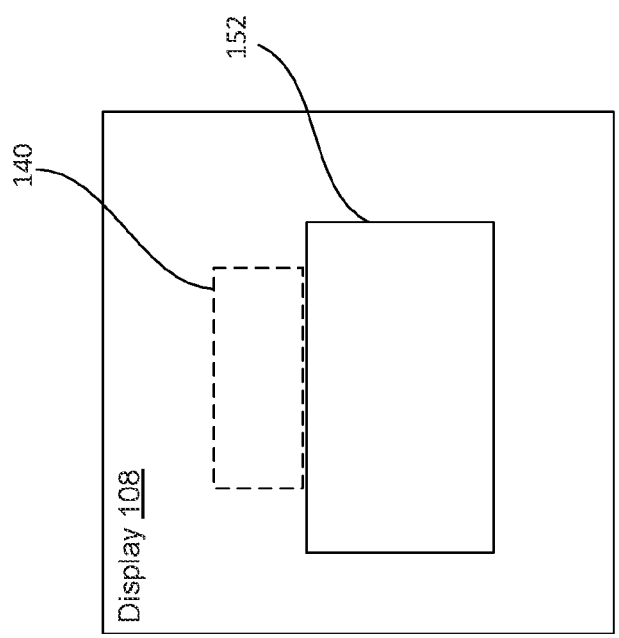
FIG. 1B depicting a user interface (UI) object rendered on a display of a computing device at a position that corresponds to a position of a controllable device according to an aspect.

FIGS. 1A through 1H illustrate a computing system 100 configured to detect a position 134 of one or more controllable devices 152 based on visual data 116 captured by a sensor system 112 on the computing system 100 and 3D maps 124 stored in a map database 105. The position 134 may be a 3D position of a controllable device 152, where the 3D position is a location (and, optionally, orientation) of the controllable device 152 in a 3D physical space in which the user (and/or the computing system 100) is situated. In some examples, the position 134 includes a six DoF position 134a of a controllable device 152. Referring to FIG. 1B, the computing system 100 uses the position 134 to render a user interface (UI) object 140 on a display 108 in a location that corresponds to and/or is within a threshold distance of the position of the controllable device 152 in 3D space. In some examples, the computing system 100 uses the position 134 to render the UI object 140 on the display 108 in a location that is proximate (e.g., as seen from the perspective of the user) to the position of the controllable device 152 in 3D space. In some examples, the UI object 140 is a virtual object rendered in a physical space captured by the image sensor 114 of the computing system 100. In some examples, the UI object 140 is a visual indicator that highlights the position of the controllable device 152 in the room. In some examples, the UI object 140 provides one or more interactive controls to control the controllable device 152. In some examples, the user may move his/her hand in a location that is proximate to the UI object 140 (e.g., as seen from the perspective of the user) so that the user can interact with the UI object 140. In some examples, the UI object 140 provides additional information about the controllable device 152.

The computing system 100 may include one or more devices, where at least one of the devices is a display device capable of being worn on or in proximity to the skin of a person. In some examples, the computing system 100 is or includes a wearable device. The wearable device may include a head-mounted display (HMD) device such as an optical head-mounted display (OHMD) device, a transparent heads-up display (HUD) device, an augmented reality (AR) device, or other devices such as goggles or headsets having sensors, display, and computing capabilities. In some examples, the wearable device includes smartglasses. Smartglasses is an optical head-mounted display device designed in the shape of a pair of eyeglasses. For example, smartglasses are glasses that add information (e.g., project a display 108) alongside what the wearer views through the glasses. In some examples, when a user is wearing the smartglasses and enters a bedroom with a smart speaker located on a dresser, the wearable device may render a UI object 140 in a position (e.g., of the display) that corresponds to and/or is within a threshold distance of the smart speaker so that the user can control the smart speaker and/or view additional information about the smart speaker.

In some examples, the computing system 100 includes a wearable device (e.g., smartglasses) and a computing device (e.g., a mobile computing device such as a smartphone, tablet, laptop, or another wearable device such as a smart watch). The wearable device may be connected to the computing device via a wireless connection such as a short-range connection (e.g., Bluetooth connection or near-field communication (NFC) connection) or an Internet connection (e.g., Wi-Fi or mobile network). In some examples, some of the components of the computing system 100 are included in the wearable device and some of the components of the computing system 100 are included in the computing device. In some examples, all of the components of the computing system 100 are included in the wearable device.

The computing system 100 includes one or more processors 104, which may be formed in a substrate configured to execute one or more machine executable instructions or pieces of software, firmware, or a combination thereof. The processors 104 can be semiconductor-based—that is, the processors can include semiconductor material that can perform digital logic. The computing system 100 can also include one or more memory devices 106. The memory devices 106 may include any type of storage device that stores information in a format that can be read and/or executed by the processor(s) 104. The memory devices 106 may store applications and modules (e.g., device detector 126, position identifier 132, UI object renderer 136, object recognition module 118, virtual anchor application 170, etc.) that, when executed by the processor(s) 104, perform certain operations. In some examples, the applications and modules may be stored in an external storage device and loaded into the memory devices 106.

The computing system 100 includes a display 108 that is projected onto the field of view of the user. The display 108 may include a liquid crystal display (LCD), a light-emitting diode (LED) display, an organic light-emitting display (OLED), an electro-phoretic display (EPD), or a micro-projection display adopting an LED light source. In some examples, the case of smartglasses, the display 108 may provide a transparent or semi-transparent display such that the user wearing the glasses can see images provided by the display 108 but also information located in the field of view of the smartglasses behind the projected images. In some examples, the UI object 140 is superimposed into an optical field of view of a user of the physical space. The computing system 100 may include one or more antennas 110 to enable communication with other computing device(s). Although not shown in FIGS. 1A through 1H, the computing system 100 may include a touchpad that allows the user to control the computing system 100 (e.g., which can allow swiping through an interface displayed on the display 108).

The computing system 100 includes a sensor system 112. The sensor system 112 includes an image sensor 114. In some examples, the sensor system 112 includes multiple image sensors 114. In some examples, while the user is wearing the computing system 100 (or a portion of the computing system 100), the image sensor 114 captures visual data 116, which may include image data along with depth information. In some examples, the image sensor 114 is a red green blue (RGB) camera. In some examples, the image sensor 114 includes a pulsed laser sensor (e.g., a LiDAR sensor) or depth camera. For example, the image sensor 114 may be a camera configured to detect and convey information used to make an image, which is represented by the visual data 116. The image sensor 114 can take pictures and record video. The sensor system 112 may include an inertial motion unit (IMU) 115. The IMU 115 may detect motion, movement, and/or acceleration of the computing system 100. The IMU 115 may include various different types of sensors such as, for example, an accelerometer, a gyroscope, a magnetometer, and other such sensors. The sensor system 112 may include other types of sensors such as a light sensor, an audio sensor, a distance and/or proximity sensor, a contact sensor such as a capacitive sensor, a timer, and/or other sensors and/or different combination(s) of sensors.

In some examples, the computing system 100 is configured to communicate with a server computer 160 over a network 150. The server computer 160 may be computing devices that take the form of a number of different devices, for example a standard server, a group of such servers, or a rack server system. In some examples, the server computer 160 is a single system sharing components such as processors and memories. The network 150 may include the Internet and/or other types of data networks, such as a local area network (LAN), a wide area network (WAN), a cellular network, satellite network, or other types of data networks. The network 150 may also include any number of computing devices (e.g., computer, servers, routers, network switches, etc.) that are configured to receive and/or transmit data within network 150.

The server computer 160 includes one or more processors 162, which may be formed in a substrate configured to execute one or more machine executable instructions or pieces of software, firmware, or a combination thereof. The processor(s) 162 can be semiconductor-based—that is, the processors can include semiconductor material that can perform digital logic. The server computer 160 includes one or more memory devices 164. The memory devices 164 may include a main memory that stores information in a format that can be read and/or executed by the processors 162.

In some examples, the server computer 160 is configured to execute a visual positioning data service 161. The visual positioning data service 161 may be an augmented reality (AR) collaboration service that allows users to create cloud anchors (e.g., 3D maps 124) for creating multiplayer or collaborative AR experiences that users can share. For example, users can add virtual objects to an AR scene, and then multiple users can then view and interact with these virtual objects simultaneously from different positions in a shared physical space. For example, a user may create a local anchor (e.g., a 3D map 124) in their environment. During hosting, the computing system 100 may upload data to generate the 3D map 124 at the visual positioning data service 161, which the visual positioning data service 161 returns a unique identifier for that 3D map 124, and the unique identifier can be distributed to other users to join the same AR environment. When another user in the same environment points their device camera at the area where the 3D map 124 (e.g., virtual cloud anchor) was hosted, a resolve request causes the visual positioning data service 161 to periodically compare visual features from the scene against the 3D map 124 that was created, which the computing system 100 uses to pinpoint the user's position and orientation relative to the 3D map 124.

The controllable devices 152 may include a wide variety of devices that can be controlled by the computing system 100. As shown in FIG. 1A, the controllable devices 152 may include a first controllable device 152-1 and a second controllable device 152-2. In some examples, the controllable devices 152 are connected to the same network as the computing system 100 (e.g., the controllable devices 152 are connected to the same Wi-Fi network as the computing system 100). Although two controllable devices 152 are depicted in FIG. 1A, the computing system 100 may be able to connect to any number of controllable devices 152. The controllable devices 152 may include lights, switches, outlets, thermostats, badge readers, fire or other environmental alarms, blinds, entertainment devices such as televisions, stereos, media player, and computing equipment such as wireless network access points, printers, scanners, and copiers. In some situations, a building may have multiple of the same type of controllable device. For example, a building may have multiple home speakers or multiple video streaming devices. Also, a building could have multiple identical or nearly identical controllable devices (e.g., light bulbs, home speakers, etc.).

A user may wish to access, control, or otherwise communicate with a controllable device 152 using the computing system 100. For example, the computing system 100 may provide access to, control of, and/or a communication with one or more controllable device(s) 152 (e.g., first controllable device 152-1 and second controllable device 152-2). In order to enable the computing system 100 to obtain an accurate position of a controllable device 152 so that UI object(s) 140 can be rendered on the display 108 to access, control, or otherwise communicate with a controllable device 152, the computing system 100 may cause the generation and storage of 3D maps 124 in a map database 105, where each 3D map 124 provides visual positioning data of a respective controllable device 152. In some examples, the map database 105 is stored in the memory device 164 at the server computer 160. In some examples, the map database 105 is stored in the memory device 106 at the computing system 100. In some examples, the map database 105 is stored on the wearable device. In some examples, the map database 105 is stored on a computing device (local to) and wirelessly connected to the wearable device.

Figure 1C:
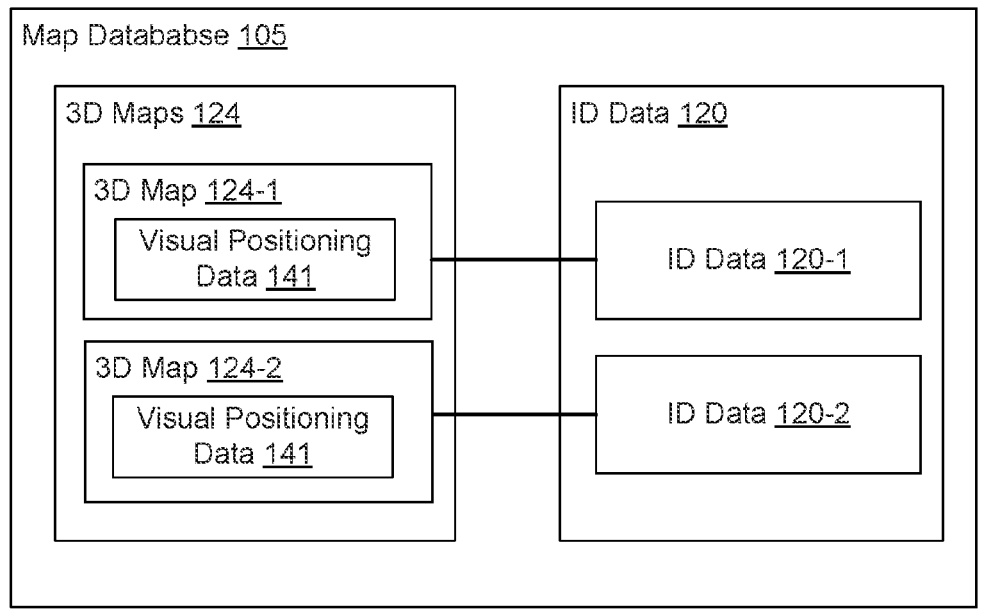
FIG. 1C illustrates a map database storing a plurality of 3D maps according to an aspect.

As shown in FIG. 1C, the map database 105 can store a plurality of 3D maps 124, where each 3D map 124 corresponds to a separate controllable device 152. For example, a first 3D map 124-1 corresponds to the first controllable device 152-1, and a second 3D map 124-2 corresponds to the second controllable device 152-2. In some examples, a 3D map 124 is a 3D mesh. In some examples, a 3D map 124 is a 3D feature map. In some examples, a 3D map 124 is a virtual anchor or virtual cloud anchor. In some examples, a 3D map 124 includes a coordinate space in which visual information from the physical space and the controllable device 152 are positioned.

Figure 1D:
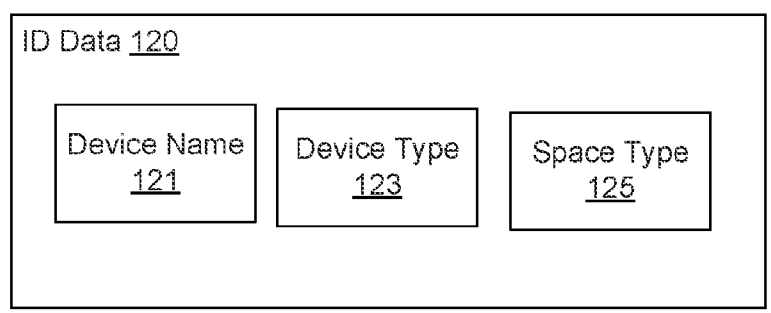
FIG. 1D illustrates an example of identification data that is linked with the 3D maps in the map database according to an aspect.

As shown in FIG. 1C, the 3D maps 124 may be stored in association with identification data 120. The identification data 120 may include one or more characteristics about the corresponding controllable device 152 and/or the space in which the controllable device 152 is located. In some examples, as shown in FIG. 1D, the identification data 120 includes a device name 121 of the controllable device 152. In some examples, the device name 121 is the name associated with the controllable device 152 (e.g., a nest thermostat, a Google home mini, etc.). In some examples, the identification data 120 includes a device type 123 of the controllable device 152. In some examples, the device type 123 identifies the type of device, e.g., a smart speaker, a media streaming device, a smart thermostat, etc. In some examples, the identification data 120 includes a space type 125 that identifies the type of space associated with the 3D map 124. For example, the space type 125 may specify a bedroom, den, living room, kitchen, etc. As shown in FIG. 1C, the first 3D map 124-1 is associated with identification data 120-1 that identifies the first controllable device 152-1, and the second 3D map 124-2 is associated with identification data 120-2 that identifies the second controllable device 152-2.

In some examples, a 3D map 124 and the corresponding identification data 120 (or a portion thereof) are generated during a setup procedure of a particular controllable device 152. In some examples, the 3D map 124 and the corresponding identification data 120 (or a portion thereof) may be generated at a point after the setup procedure of a particular controllable device 152. In some examples, the 3D map 124 and the corresponding identification data 120 are generated at the same time (or around the same time) as each other. In some examples, the identification data 120 is generated and linked to a corresponding 3D map 124 after the generation of the 3D map 124.

In some examples, during the setup of the first controllable device 152-1, the computing system 100 (e.g., which can be a wearable device or mobile device such as a smartphone) is used to mark the location of the first controllable device 152-1. The user may point the image sensor 114 on the computing system 100 at a center of interest (e.g., the first controllable device 152-1) and move the computing system 100 around to map the environment from different viewing angles and positions to compute feature points of the surrounding of the first controllable device 152-1. The data collected by the computing system 100 is used to generate feature points. The feature points may be interesting points that represent the user's environment. In some examples, each feature point approximates a fixed location and orientation in the physical space, and the set of visual feature points may be updated over time as the user moves the device around to map the physical space.

In some examples, the feature points are then transmitted to the visual positioning data service 161 at the server computer 160 to generate a first 3D map 124-1, and the first 3D map 124-1 is stored in the map database 105 at the server computer 160. As explained above, the first 3D map 124-1 is stored in association with identification data 120-1 (e.g., device name 121, device type 123, space type 125, etc.) that identifies the first controllable device 152-1. If the first controllable device 152-1 is a smart speaker, the identification data 120-1 may indicate that the first 3D map 124-1 is associated with a smart speaker, the name of the smart speaker, and/or the type of smart speaker. In some examples, the visual positioning data service 161 at the server computer 160 may analyze the feature points to determine which type of physical space is associated with the first controllable device 152-1 (e.g., a bed in the room of the first controllable device 152-1 may indicate that the first controllable device 152-1 is in a bedroom), and the first 3D map 124-1 is stored in association with the space type 125. In some examples, instead of generating the first 3D map 124-1 at the server computer 160, the computing system 100 may generate and store the first 3D map 124-1 (and corresponding identification data 120-1) in the map database 105 at the memory device 106 using feature points or generally any type of 3D scanning technique.

The same operations may be applied during the setup of another controllable device 152. For example, during the setup of a second controllable device 152-2, a second 3D map 124-2 is generated that identifies the location of the second controllable device 152-2. The second 3D map 124-2 is stored in association with identification data 120-2 (e.g., device name 121, device type 123, space type 125, etc.) associated with the second controllable device 152-2. If the second controllable device 152-2 is a smart thermostat, the identification data 120-2 may indicate that the second 3D map 124-2 is associated with a smart thermostat, the name of the smart thermostat, and/or the type of smart thermostat. In some examples, the visual positioning data service 161 at the server computer 160 may analyze the feature points to determine which type of physical space is associated with the second controllable device 152-2 (e.g., a couch in the room of the second controllable device 152-2 may indicate that the second controllable device 152-2 is in a living room), and the second 3D map 124-2 is stored in association with the space type 125. In some examples, the first controllable device 152-1 is located in the same space as the second controllable device 152-2. In some examples, the first controllable device 152-1 is located in a different space as the second controllable device 152-2.

After the setup procedure (e.g., during normal use of the computing system 100), the user may enter a physical space and use the image sensor 114 to capture visual data 116. The computing system 100 includes a device detector 126 configured to detect a controllable device 152 and a position 134 of the controllable device 152 using the visual data 116 and the map database 105. The position 134 may include a six DoF position 134a of the controllable device 152. In some examples, the six DOF position 134 includes information describing translation and rotation such as moving up and down (e.g., elevating/heaving), moving left and right (e.g., strafing/swaying), moving forward and backward (e.g., walking/surging), swivels left and right (e.g., yawing), tilts forward and backward (e.g., pitching), and/or pivots side to side (e.g., rolling).

The device detector 126 includes an object recognition module 118. The object recognition module 118 may include one or more image recognition algorithms, which may include one or more neural networks. In some examples, when directing the image sensor 114 at an object, the object recognition module 118 is configured to identify the object by reading barcodes, QR codes, labels, and/or text. The object recognition module 118 is configured to identify objects in the visual data 116 and generate identification data 120 about the detected objects. The identification data 120 generated by the object recognition module 118 is used to select or identify which 3D maps 124 in the map database 105 to resolve against the visual data 116. As indicated above, the identification data 120 may include the device name 121, the device type 123, the space type 125, and/or other characteristic(s) about the controllable device 152 or the space that includes the controllable device 152.

For example, if the first controllable device 152-1 is captured by the visual data 116, the object recognition module 118 may generate the identification data 120 to include device name 121 and/or the device type 123 of the first controllable device 152-1. Similarly, if the second controllable device 152-2 is captured by the visual data 116, the object recognition module 118 may generate the identification data 120 to include the device name 121 and/or the device type 123 of the second controllable device 152-2. In some examples, if a bed is captured by the visual data 116, the object recognition module 118 may generate the identification data 120 to include the space type 125 (e.g., a bedroom). In some examples, if an oven is captured by the visual data 116, the object recognition module 118 may generate the identification data 120 to include the space type 125 (e.g., a kitchen).

Figure 1E:
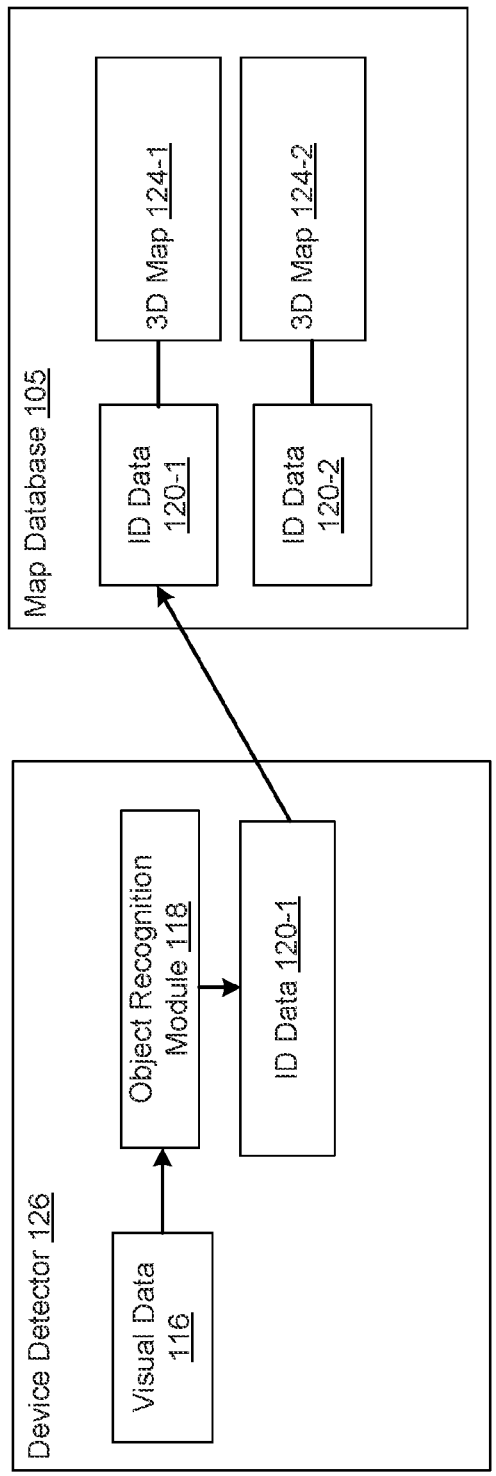
FIG. 1E illustrates an example of a device detector that can identify a 3D map in a map database based on the identification data according to an aspect.

The device detector 126 includes a position identifier 132 that uses the identification data 120 to identify a 3D map 124 stored in the map database 105. As shown in FIG. 1E, if the identification data 120 is the identification data 120-1, the first 3D map 124-1 may be identified among the plurality of 3D maps 124 because the first 3D map 124-1 is stored in the map database 105 in association with the identification data 120-1. In some examples, the identification data 120-1 may indicate a home speaker and the second identification data 120-2 may indicate a smart light bulb. If the identification data 120 received at the position identifier 132 indicates the home speaker, the first 3D map 124-1 may be identified.

Then, the visual data 116 is compared against the identified 3D map 124 to determine whether there is a match. For example, in order to determine that the identified 3D map 124 at least partially corresponds to a physical space represented by the visual data 116 captured by the image sensor 114, the visual data 116 is compared against the 3D map 124 to determine whether there is a match (e.g., involves the same physical space). For example, the visual feature points in the 3D map 124 may be used to compare and match against other visual feature points (e.g., detected from visual data 116) in order to determine whether the physical space is the same as the physical space of the stored feature points and to calculate the location of controllable device 152 within the physical space.

If there is a match, the position identifier 132 obtains the visual positioning data 141 of the 3D map 124. In some examples, the visual positioning data 141 includes a pose (e.g., position and orientation) of the controllable device 152. The position identifier 132 uses the visual positioning data 141 to compute the position 134 of the controllable device 152-1 relative to the computing system 100. In some examples, the position identifier 132 uses the visual positioning data 141 and information from the IMU 115 to compute the position 134 of the controllable device 152-1 relative to the computing system 100.

If the map database 105 is stored in the memory device 164 at the server computer 160, the device detector 126 may operate in conjunction with the antenna(s) 110 to communicate with the visual positioning data service 161 at the server computer 160. For example, the device detector 126 may transmit the identification data 120 and the visual data 116 to the visual positioning data service 161. The visual positioning data service 161 may identify the appropriate 3D map 124 from the map database 105 stored in the memory device 164 at the server computer 160, compare the visual data 116 against the identified 3D map 124, and if the comparison results in a match, the visual positioning data service 161 may return the visual positioning data 141 of the 3D map 124 to the device detector 126.

If the map database 105 is stored in the memory device 106 at the computing system 100, in some examples, the device detector 126 may identify the appropriate 3D map 124 from the map database 105 stored in the memory device 106 at the computing system 100, compare the visual data 116 against the identified 3D map 124, and if the comparison results in a match, the position identifier 132 may obtain the visual positioning data 141 from the appropriate 3D map 124.

In some examples, the device detector 126 uses other signals besides the visual data 116 to assist with detecting a controllable device 152. For example, the device detector 126 may receive one or more wireless signals 130 and use the wireless signals 130 to distinguish between multiple, similar-looking controllable devices 152. In some examples, the wireless signals 130 includes short-range wireless signals such as Bluetooth signals and/or NFC signals (or ultrasonic signals). For example, if two similar-looking controllable devices 152 are in the area of the user, the device detector 126 may receive Bluetooth signals from the controllable devices 152, and the strength of the Bluetooth signals may provide an indication of which controllable device 152 the user intends to control.

The computing system 100 includes a UI object renderer 136 that uses the position 134 to render a UI object 140 on the display 108 at a location that is proximate to the position 134 of the controllable device 152 in 3D space. In some examples, the UI object 140 is a virtual object that is positioned in the physical space that the user views through the smartglasses. In some examples, the UI object 140 may be positioned at a location that is close to the position 134 of the controllable device 152 in the real world. In some examples, the UI object 140 is positioned on the display 108 at a location that is within a threshold distance of the position 134 of the controllable device 152 in 3D space. In other words, the distance between the position of the UI object 140 and the position 134 of the controllable device 152 may be less than a threshold level. In some examples, the UI object 140 is rendered on the display 108 at a position in which the user would recognize that the information provided by the UI object 140 corresponds to the controllable device 152. In some examples, the UI object 140 is rendered on the display 108 at a location that corresponds to the position 134 of the controllable device 152. In some examples, the position of the UI object 140 is determined or calculated using the position 134 of the controllable device 152 as a reference. In some examples, the UI object 140 provides one or more controls to control the controllable device 152. For example, the UI object 140 may provide one or more controls to launch an application on a media streaming player, change the volume of a smart speaker, play a song on the smart speaker, etc. In some examples, the UI object 140 provides additional information about the controllable device 152. For example, the UI object 140 may specify historical data about a smart thermostat.

Figure 1F:
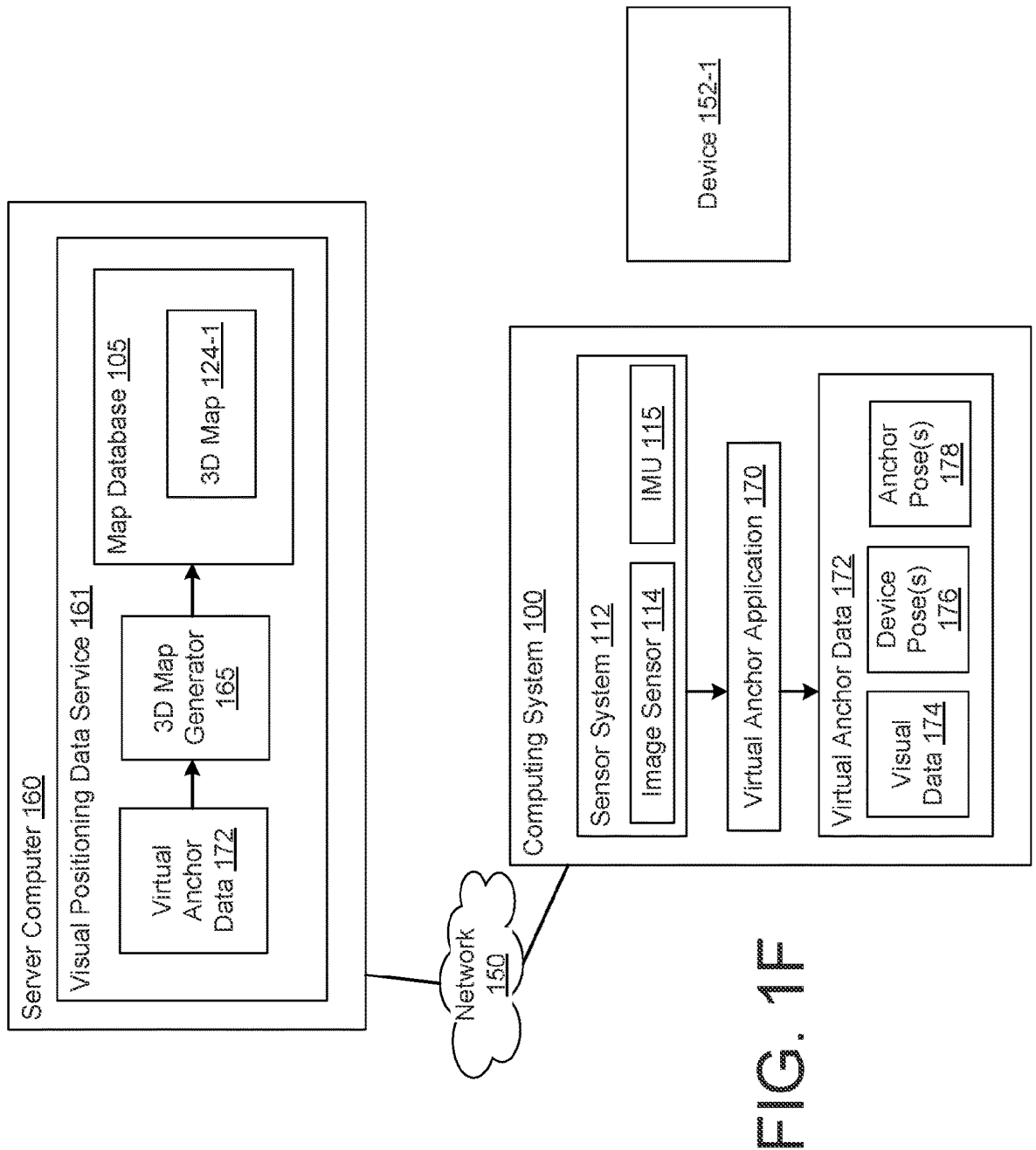
FIG. 1F illustrates a system for generating and storing 3D maps at a server computer according to an aspect.
Figure 1G:
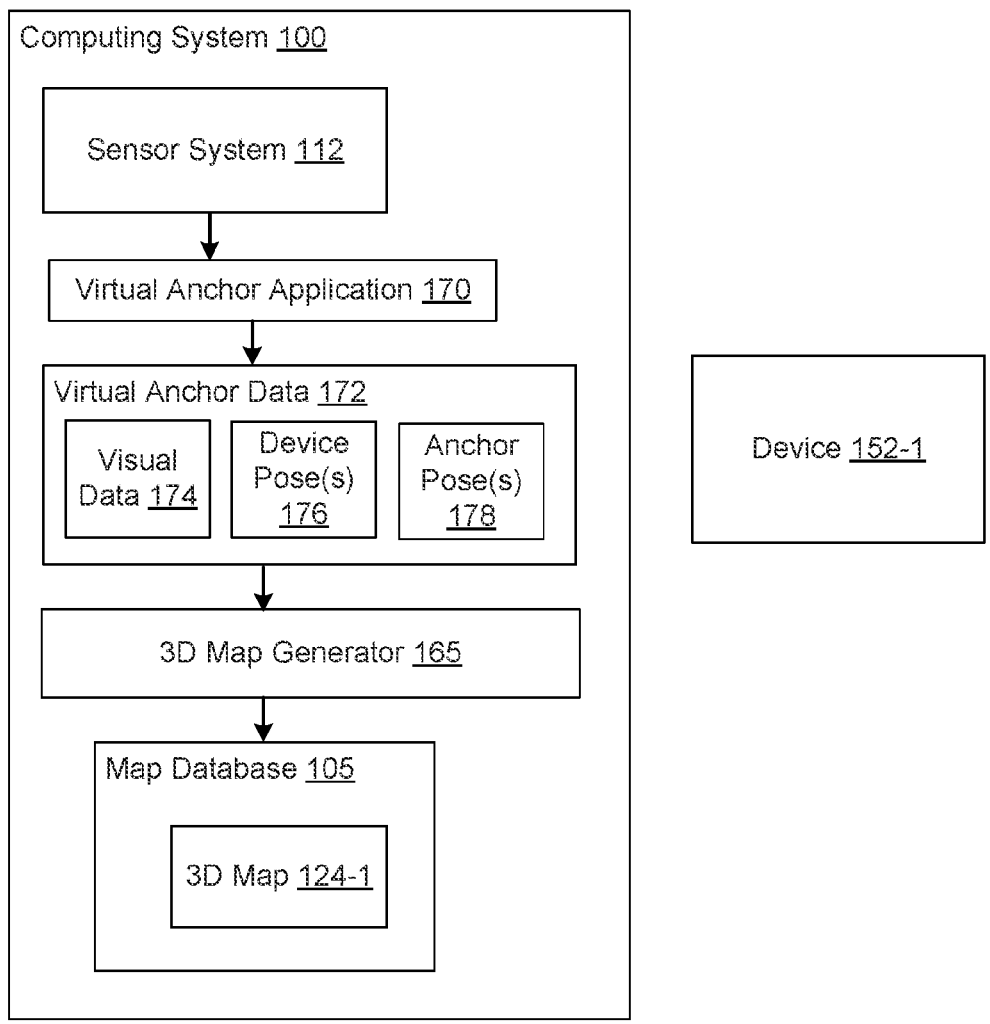
FIG. 1G illustrates a computing system for generating and storing 3D maps according to an aspect.
Figure 1H:
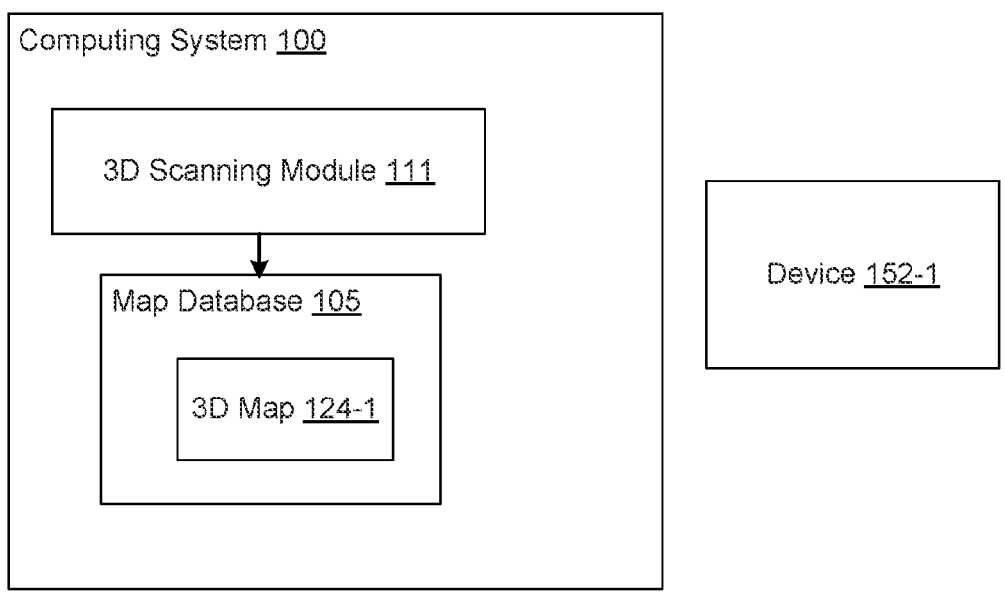
FIG. 1H illustrates a computing system for generating and storing 3D maps according to another aspect.

FIGS. 1F through 1H illustrate various examples of generating and storing 3D maps 124. FIG. 1F illustrates the generation and storage of a first 3D map 124-1 for a first controllable device 152-1 at a server computer according to an aspect. FIG. 1G illustrates the generation and storage of a first 3D map 124-1 for a first controllable device 152-1 at the computing system 100 according to an aspect. FIG. 1H illustrates the generation and storage of a first 3D map 124-1 for a first controllable device 152-1 at the computing system 100 according to another aspect.

Referring to FIG. 1F, during the setup of the first controllable device 152-1, the computing system 100 may be used to mark the location of the first controllable device 152-1. The user may point the image sensor 114 of the sensor system 112 at the first controllable device 152-1 and move the computing system 100 around to map the environment from different viewing angles and positions. In some examples, the computing system 100 includes a virtual anchor application 170 that receives the data from the sensor system 112 and generates virtual anchor data 172. The virtual anchor data 172 may include visual data 174, device pose(s) 176, and anchor pose(s) 178. In some examples, the visual data 174 is an example of the visual data 116. The virtual anchor application 170 is configured to communicate with the visual positioning data service 161 at the server computer 160 (via one or more application programming interfaces (APIs)). The virtual anchor application 170 is configured to detect and track its position relative to the physical space, detect the size and location of different types of surfaces (e.g., horizontal, vertical, angled), and estimate the environment's current lighting conditions. The virtual anchor application 170 is configured to transmit the virtual anchor data 172 (as the computing system 100 maps the environment) to the visual positioning data service 161. The visual positioning data service 161 includes a 3D map generator 165 configured to generate the first 3D map 124-1 based on the virtual anchor data 172. The 3D map generator 165 is configured to store the first 3D map 124-1 in the map database 105.

In some examples, the virtual anchor application 170 is configured to detect a set of visual feature points from the visual data 174 and track the movement of the set of visual feature points over time. The set of visual feature points are a plurality of points (e.g., interesting points) that represent the user's environment, and the set of visual feature points may be updated over time. In some examples, the set of visual feature points may be referred to an anchor or a set of persistent visual features that represent physical objects in the physical world, and the set of visual feature points are stored in the map database 105, which may be to localize the environment in a subsequent session or for another user.

Referring to FIG. 1G, during the setup of the first controllable device 152-1, similar to FIG. 1F, the computing system 100 is used to mark the location of the first controllable device 152-1. The user may point the image sensor 114 of the sensor system 112 at the first controllable device 152-1 and move the computing system 100 around to map the environment from different viewing angles and positions. The virtual anchor application 170 receives the data from the sensor system 112 and generates virtual anchor data 172, which includes visual data 174, device pose(s) 176, and anchor pose(s) 178. In the example of FIG. 1G, the computing system 100 includes a 3D map generator 165 configured to generate the first 3D map 124-1 based on the virtual anchor data 172. The 3D map generator 165 is configured to store the first 3D map 124-1 in the map database 105 at the computing system 100.

Referring to FIG. 1H, during the setup of the first controllable device 152-1, similar to FIGS. 1F and 1G, the computing system 100 is used to mark the location of the first controllable device 152-1. In some examples, the computing system 100 includes a 3D scanning module 111 configured to scan the environment of the first controllable device 152-1 and create the first 3D map 124-1, which is stored in the map database 105 at the computing system 100.

Figure 2:
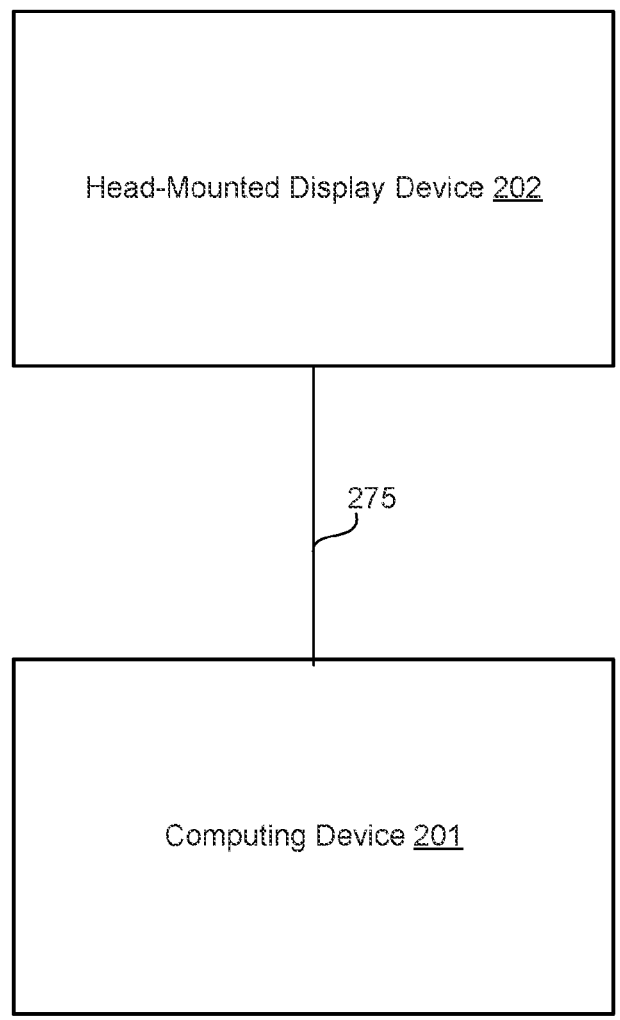
FIG. 2 illustrates a computing system having a head-mounted display device and a computing device according to an aspect.

FIG. 2 illustrates a computing system 200 according to another aspect. The computing system 200 may include any of the features described with reference to the computing system 100 of FIGS. 1A through 1H. In some examples, the computing system 200 includes a head-mounted display device 202. In some examples, the head-mounted display device 202 includes all of the components of the computing system 100 of FIGS. 1A through 1H. For example, the head-mounted display device 202 may include the processor(s) 104, the memory device(s) 106, the display 108, the sensor system 112 (including the image sensor 114 and the IMU 115), the antenna(s), the device detector 126 (and the subcomponents of the device detector 126), and the UI object renderer 136 of FIGS. 1A through 1H. In some examples, the head-mounted display device 202 includes the map database 105. In some examples, the head-mounted display device 202 is configured to generate and store the 3D maps 124 as explained with reference to FIGS. 1F through 1H (e.g., during the setup procedure), where the 3D maps 124 can be stored locally on the head-mounted display device 202 or on a server computer (e.g., server computer 160 of FIGS. 1A through 1H). In some examples, the virtual anchor application 170 of FIGS. 1F and 1G is included in the head-mounted display device 202. In some examples, the 3D scanning module 111 is included in the head-mounted display device 202.

In some examples, the computing system 200 includes the head-mounted display device 202 and a computing device 201. The computing device 201 may be connected to the head-mounted display device 202 via a wireless connection 275. In some examples, the computing device 201 includes a mobile computing device such as a smartphone, tablet, laptop, or other wearable device. In some examples, the wireless connection 275 is a short-range communication link such as near-field communication (NFC) connection or Bluetooth connection. In some examples, the wireless connection 275 is a network connection such as a local area network (LAN), a wide area network (WAN), a cellular network, satellite network, or other types of data networks. In some examples, the wireless connection 275 may include any number of computing devices (e.g., computer, servers, routers, network switches, etc.) that are configured to receive and/or transmit data within a network.

In some examples, some of the components of the computing system 100 of FIGS. 1A through 1H are included in the head-mounted display device 202, and some of the components of the computing system 100 of FIGS. 1A through 1H are included in the computing device 201. In some examples, the sensor system 112, the processor(s) 104, the memory device(s) 106, the antenna(s) 110, and the display 108 of FIGS. 1A through 1H are included in the head-mounted display device 202. In some examples, the UI object renderer 136 of FIGS. 1A through 1H is included in the head-mounted display device 202. In some examples, the UI object renderer 136 of FIGS. 1A through 1H is included in the computing device 201. In some examples, the map database 105 of FIGS. 1A through 1H is stored at the computing device 201. In some examples, the map database 105 of FIGS. 1A through 1H is stored at a server computer (e.g., the server computer 160 of FIGS. 1A through 1H), where the computing device 201 and/or the head-mounted display device 202 is configured to communicate with the server computer 160 of FIGS. 1A through 1H.

In some examples, the device detector 126 of FIGS. 1A through 1H is included in the computing device 201. In some examples, the visual data 116 captured by the sensor system 112 on the head-mounted display device 202 may be transmitted to the computing device 201 over the wireless connection 275. The device detector 126 may detect the position 134 of a controllable device 152 and transmit the position 134 to the head-mounted display device 202 over the wireless connection 275 to be used by the UI object renderer 136 on the head-mounted display device 202. In some examples, the UI object renderer 136 is included on the computing device 201, which transmits instructions over the wireless connection 275 to render a UI object 140 on the display 108 on the head-mounted display device 202. In some examples, the object recognition module 118 of FIGS. 1A through 1H is included in the head-mounted display device 202, and the position identifier 132 is included in the computing device 201, where the head-mounted display device 202 transmits the identification data 120 to the position identifier 132 on the computing device 201.

In some examples, the computing device 201 is configured to generate and store the 3D maps 124 as explained with reference to FIGS. 1F through 1H (e.g., during the setup procedure), where the 3D maps 124 can be stored locally on the computing device 201 or on a server computer (e.g., server computer 160 of FIGS. 1A through 1H). In some examples, the virtual anchor application 170 of FIGS. 1F and 1G is included in the computing device 201. In some examples, the virtual anchor application 170 of FIGS. 1F and 1G is included in the computing device 201 and the head-mounted display device 202. In some examples, the 3D scanning module 111 is included in the computing device 201.

Figure 3:
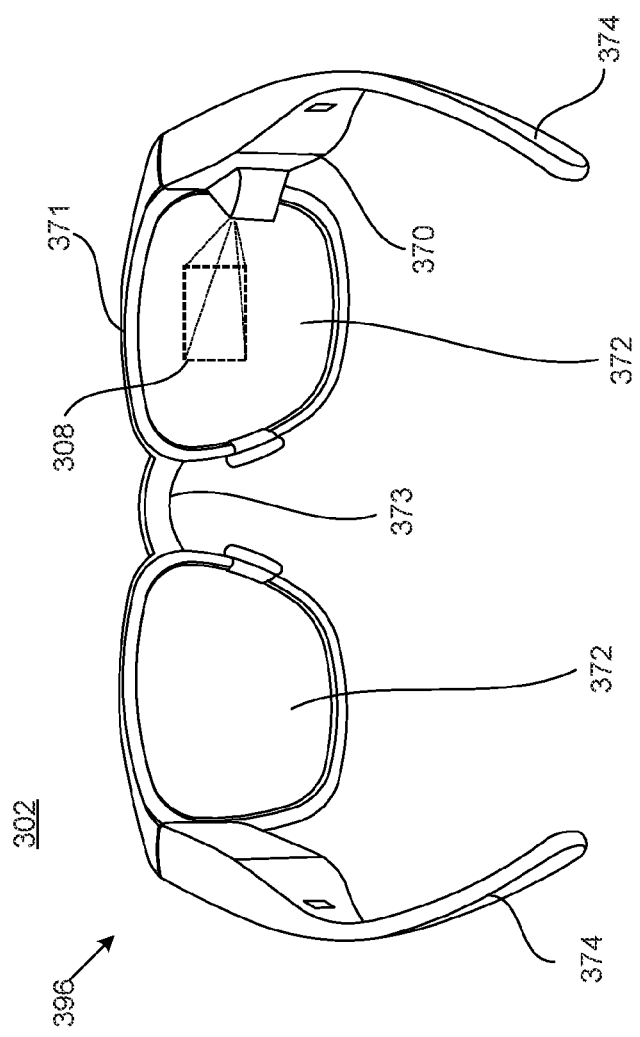
FIG. 3 illustrates an example of smartglasses according to an aspect.

FIG. 3 illustrates an example of a head-mounted display device 302 according to an aspect. The head-mounted display device 302 may be an example of the computing system 100 of FIGS. 1A through 1H and/or the head-mounted display device 202 of FIG. 2. The head-mounted display device 302 includes smartglasses 396. Smartglasses 396 are glasses that add information (e.g., project a display 308) alongside what the wearer views through the glasses. In some examples, instead of projecting information, the display 308 is an in-lens micro display. In some examples, smartglasses 396 (e.g., eyeglasses or spectacles), are vision aids, including lenses 372 (e.g., glass or hard plastic lenses) mounted in a frame 371 that holds them in front of a person's eyes, typically utilizing a bridge 373 over the nose, and legs 374 (e.g., temples or temple pieces) which rest over the ears. The smartglasses 396 include an electronics component 370 that includes circuitry of the smartglasses 396. In some examples, the electronics component 370 includes a housing that encloses the components of the computing system 100 of FIGS. 1A through 1H and/or the components of the head-mounted display device 202 of FIG. 2. In some examples, the electronics component 370 is included or integrated into one of the legs 374 (or both of the legs 374) of the smartglasses 396.

FIGS. 4A through 4D illustrate examples of a display 408 depicting UI objects 440 positioned in a location that is (e.g., in the resulting visual impression) proximate to a detected controllable device 452. In some examples, the controllable device 452 includes a smart speaker. However, the controllable device 452 may include any type of controllable device discussed herein. In some examples, the information depicted in the display 408 is the visual information shown through the lens of smartglasses. The UI objects 440 may be considered virtual objects that are positioned in a physical space as shown through the smartglasses.

Figure 4A:
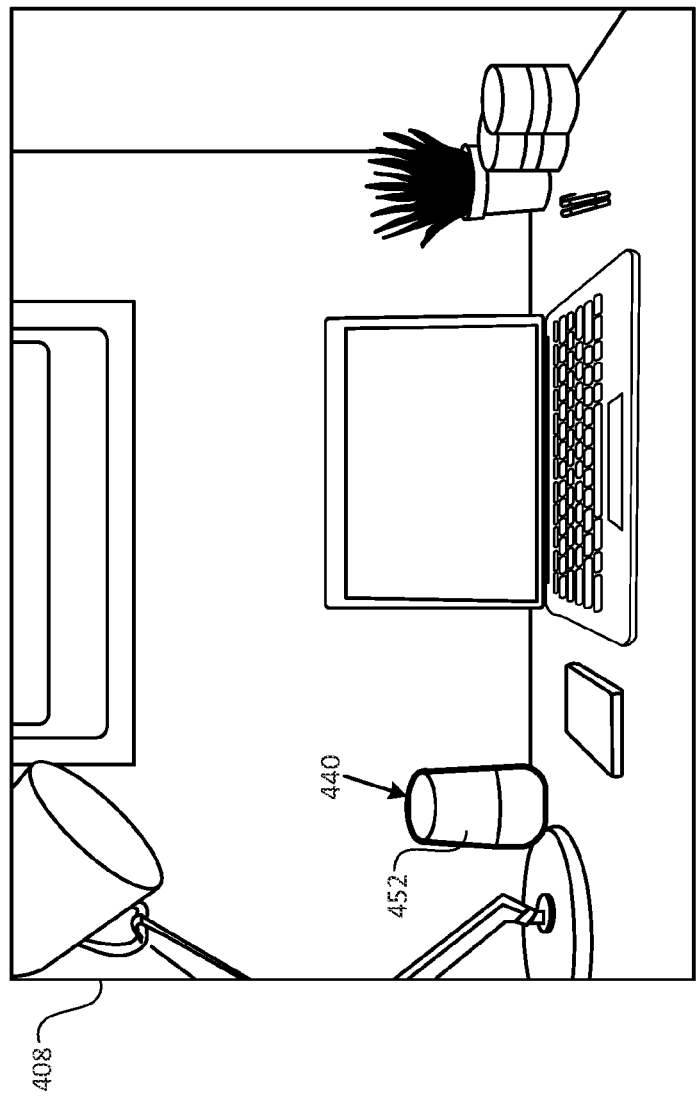
Figure 4C:
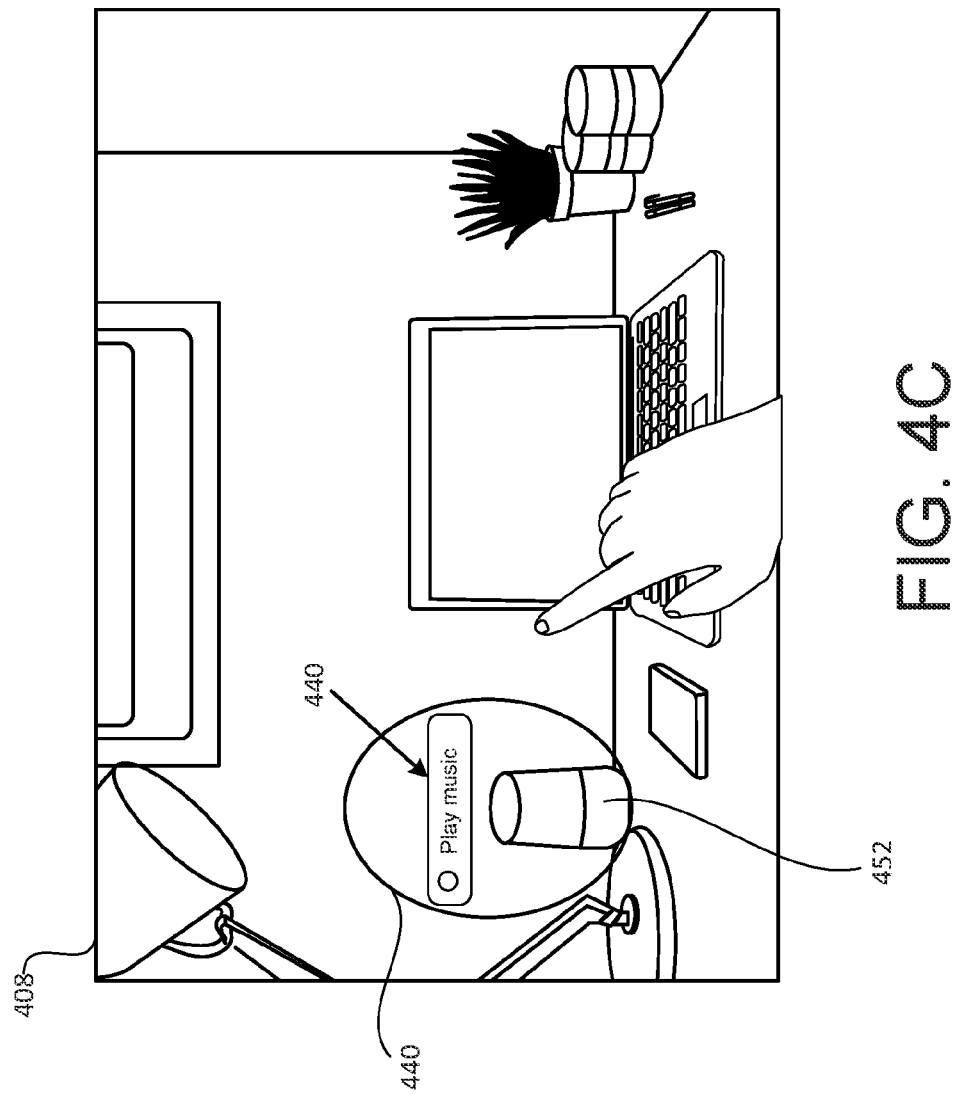

Referring to FIG. 4A, a UI object 440 may be rendered as a visual indicator around the controllable device 452, which depicts the location of the controllable device 452 in 3D space. Referring to FIG. 4B, UI objects 440 may be rendered in positions proximate (e.g., close to) to the controllable device 452. In FIG. 4B, the UI objects 440 includes a visual indicator around the controllable device 452 and a UI control that allows the user to interact with the controllable device 452. In some examples, the user may interact with the UI control to control the controllable device such as a control to play music. Referring to FIG. 4C, the UI objects 440 may include UI control that allows the user to interact with the controllable device 452 and a visual indicator that indicates an area in which a hand (or finger) of the user is positioned in reference to the other visual information shown in the display 408. For instance, the user can move his/her hand (or finger) in the area of a UI object 440 to interact with the controllable device 452. The visual indicator in FIG. 4C may assist the user in determining which position/direction the user's body part is located in reference to the UI object 440. Referring to 4D, the UI objects 440 may include a visual indicator that indicates an area in which a hand (or finger) of the user is positioned in reference to the other visual information shown in the display 408 and multiple UI controls that permit the user to control the controllable device 452. In some examples, the UI controls may include actions such as playing music or searching the web.

Figure 5:
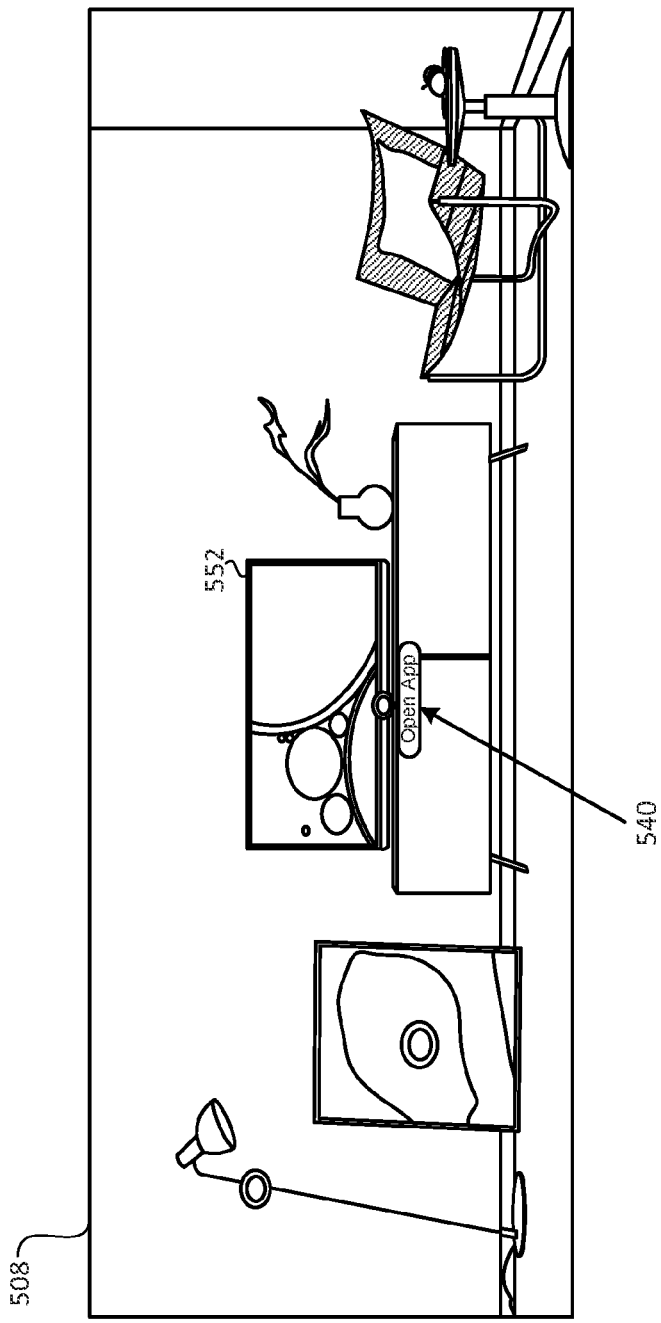
FIGS. 5 through 8 illustrate example displays having a UI object rendered in a position that corresponds to a position of a controllable device.

FIG. 5 illustrate examples of a display 508 depicting a UI object 540 positioned in a location that is proximate to a detected controllable device 552. In some examples, the controllable device 552 includes a smart television or media streaming device. However, the controllable device 552 may include any type of controllable device discussed herein. In some examples, the information depicted in the display 508 is the visual information shown through the lens of smartglasses. The UI object 540 may be considered a virtual object that is positioned in a physical space as shown through the smartglasses. Referring to FIG. 5, a UI object 540 includes a UI control that allows the user to interact with the controllable device 552 such as open an application such as a media streaming application.

Figure 6:
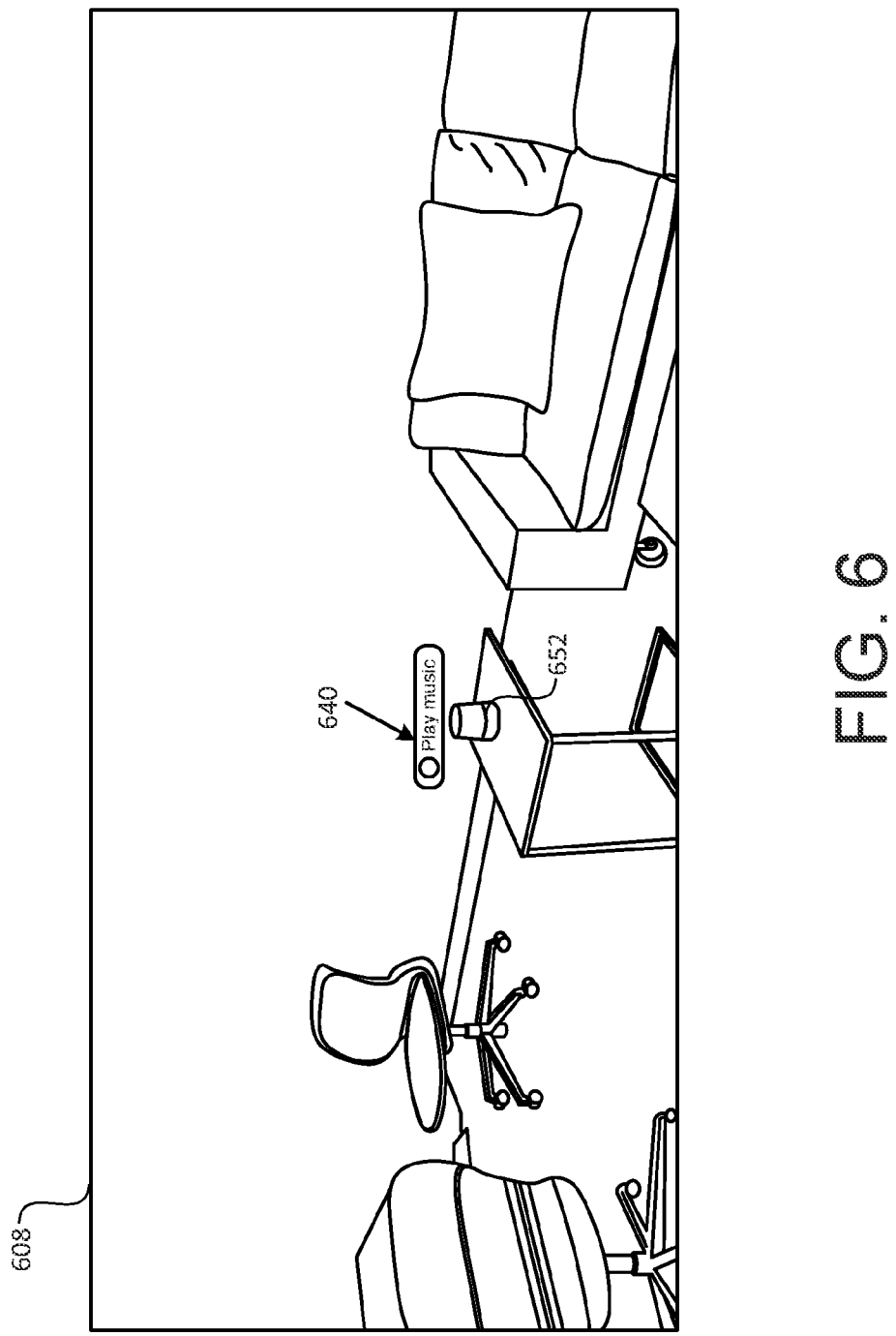

FIG. 6 illustrate examples of a display 608 depicting a UI object 640 positioned in a location that is proximate (e.g., close to) to a detected controllable device 652. In some examples, the controllable device 652 includes a smart speaker. However, the controllable device 652 may include any type of controllable device discussed herein. In some examples, the information depicted in the display 608 is the visual information shown through the lens of smartglasses. The UI object 640 may be considered a virtual object that is positioned in a physical space as shown through the smartglasses. Referring to FIG. 6, a UI object 640 includes a UI control that allows the user to interact with the controllable device 652 such as a control to play music.

Figure 7:
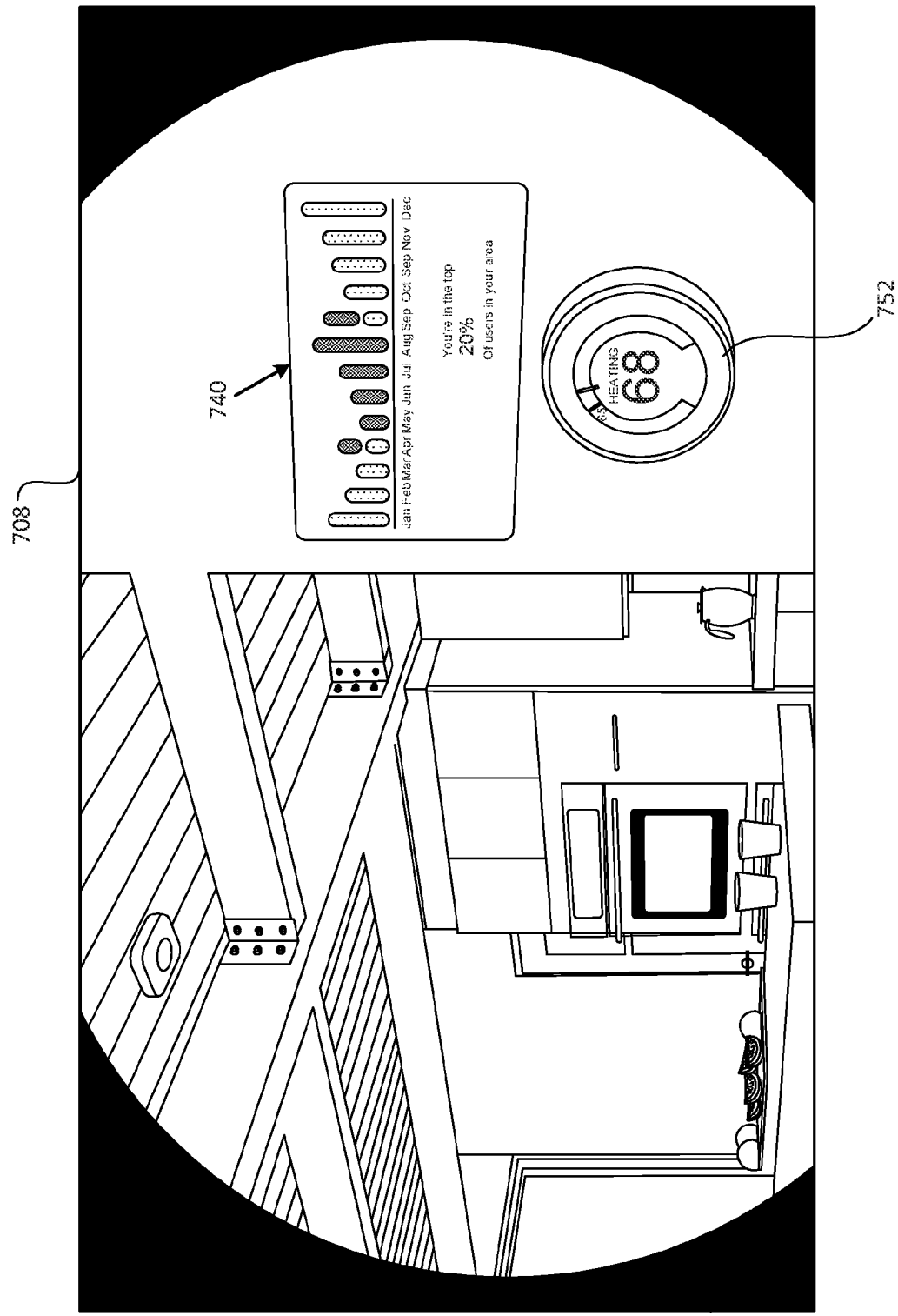

FIG. 7 illustrate examples of a display 708 depicting a UI object 740 positioned in a location that is proximate to (e.g., close to) a detected controllable device 752. In some examples, the controllable device 752 includes a smart thermostat. However, the controllable device 752 may include any type of controllable device discussed herein. In some examples, the information depicted in the display 708 is the visual information shown through the lens of smartglasses. The UI object 740 may be considered a virtual object that is positioned in a physical space as shown through the smartglasses. Referring to FIG. 7, a UI object 740 provides additional information about the controllable device 752 such as historical data or other information about the controllable device 752.

Figure 8:
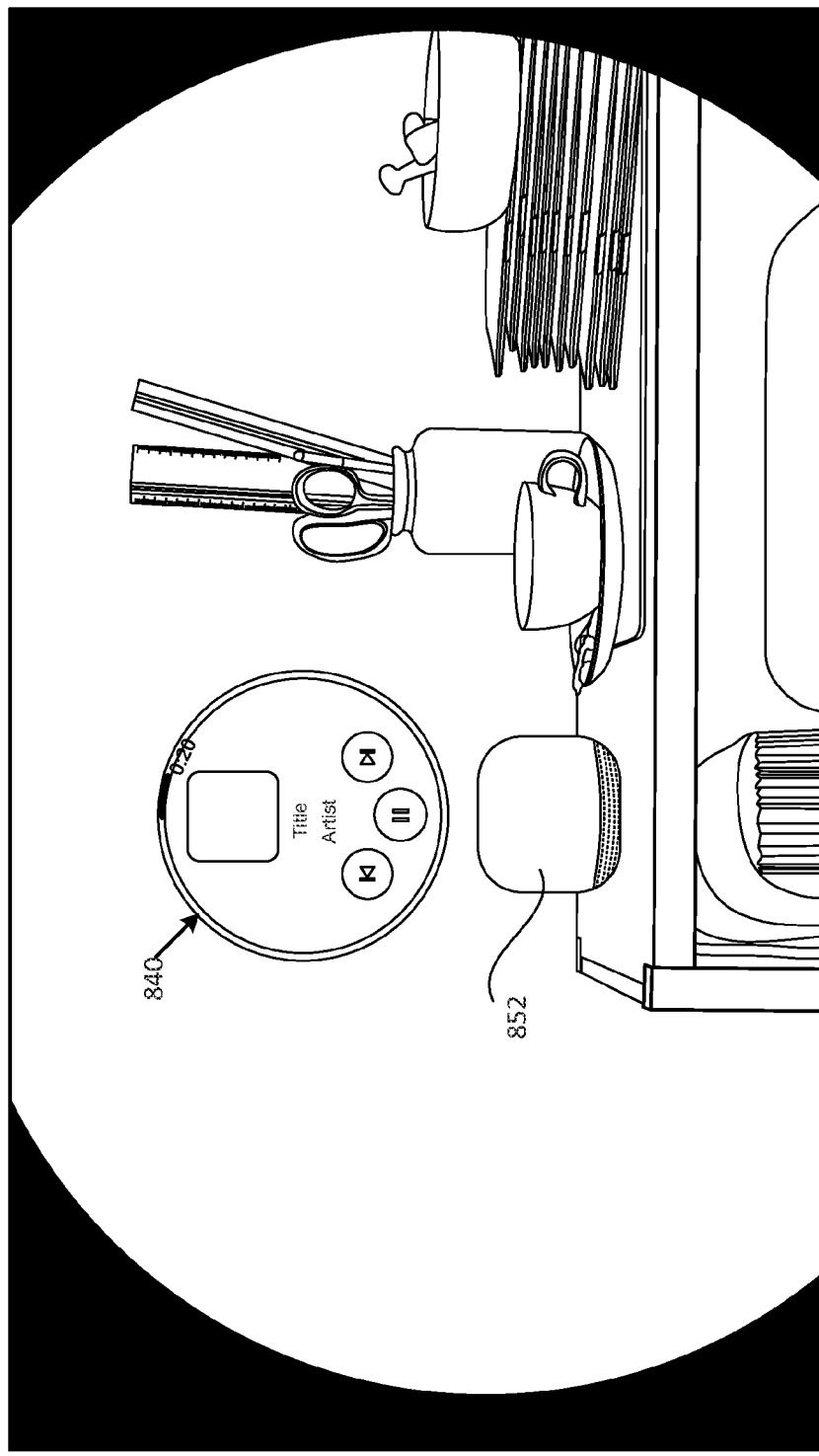

FIG. 8 illustrate examples of a display 808 depicting a UI object 840 positioned in a location that is proximate to (e.g., close to) a detected controllable device 852. In some examples, the controllable device 852 includes a smart speaker. However, the controllable device 852 may include any type of controllable device discussed herein. In some examples, the information depicted in the display 808 is the visual information shown through the lens of smartglasses. The UI object 840 may be considered a virtual object that is positioned in a physical space as shown through the smartglasses. Referring to FIG. 8, a UI object 840 includes UI controls for controlling the smart speaker and information about what is playing on the smart speaker.

Figure 9:
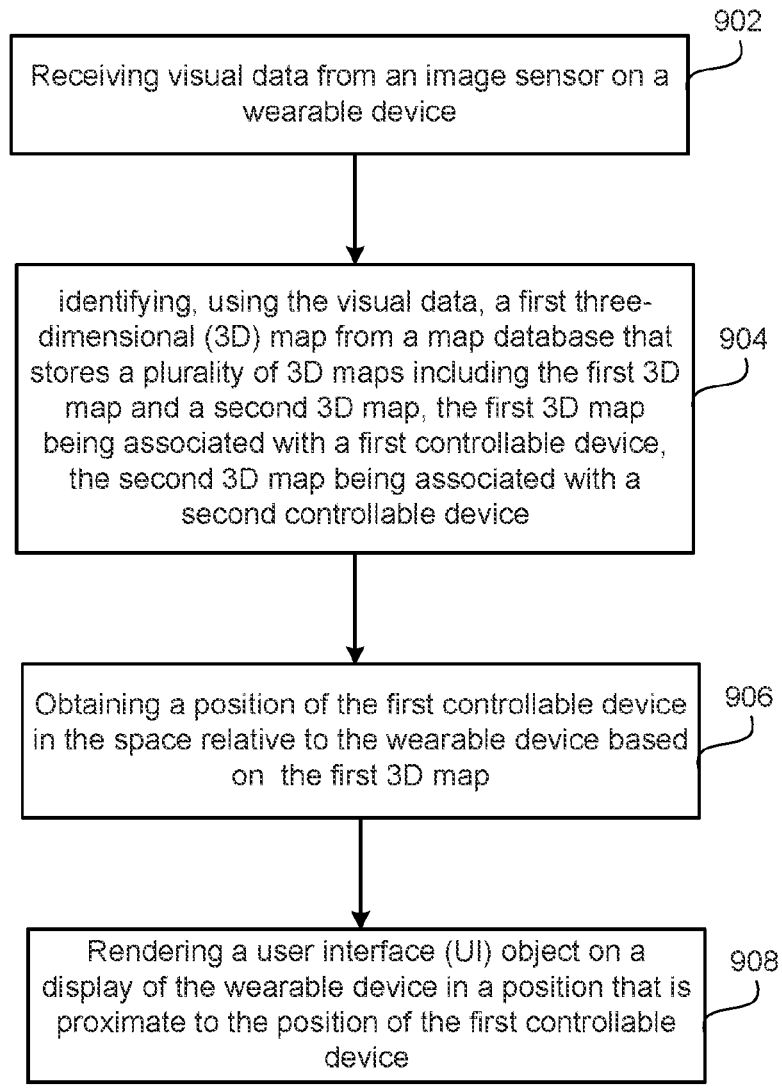
FIG. 9 illustrates a flowchart depicting example operations of a computing system according to an aspect.

FIG. 9 illustrates a flowchart 900 depicting example operations of the computing system 100 of FIGS. 1A through 1H. Although the flowchart 900 is described with reference to the computing system 100 of FIGS. 1A through 1H, the flowchart 900 may be applicable to any of the embodiments herein.

Operation 902 includes receiving visual data 116 from an image sensor 114 on a wearable device (e.g., a computing system 100). Operation 904 includes identifying, using the visual data 116, a first three-dimensional (3D) map 124-1 from a map database 105 that stores a plurality of 3D maps 124 including the first 3D map 124-1 and a second 3D map 124-2, where the first 3D map 124-1 is associated with a first controllable device 152-1, and the second 3D map 124-2 is associated with a second controllable device 152-2. Operation 906 includes obtaining a position 134 (e.g., a six DoF position 134a) of the first controllable device 152-1 in the space relative to the wearable device based on the first 3D map 124-1. Operation 908 includes rendering a user interface (UI) object 140 on a display 108 of the wearable device in a position that is proximate to the position 134 of the first controllable device 152-1.

Figure 10:
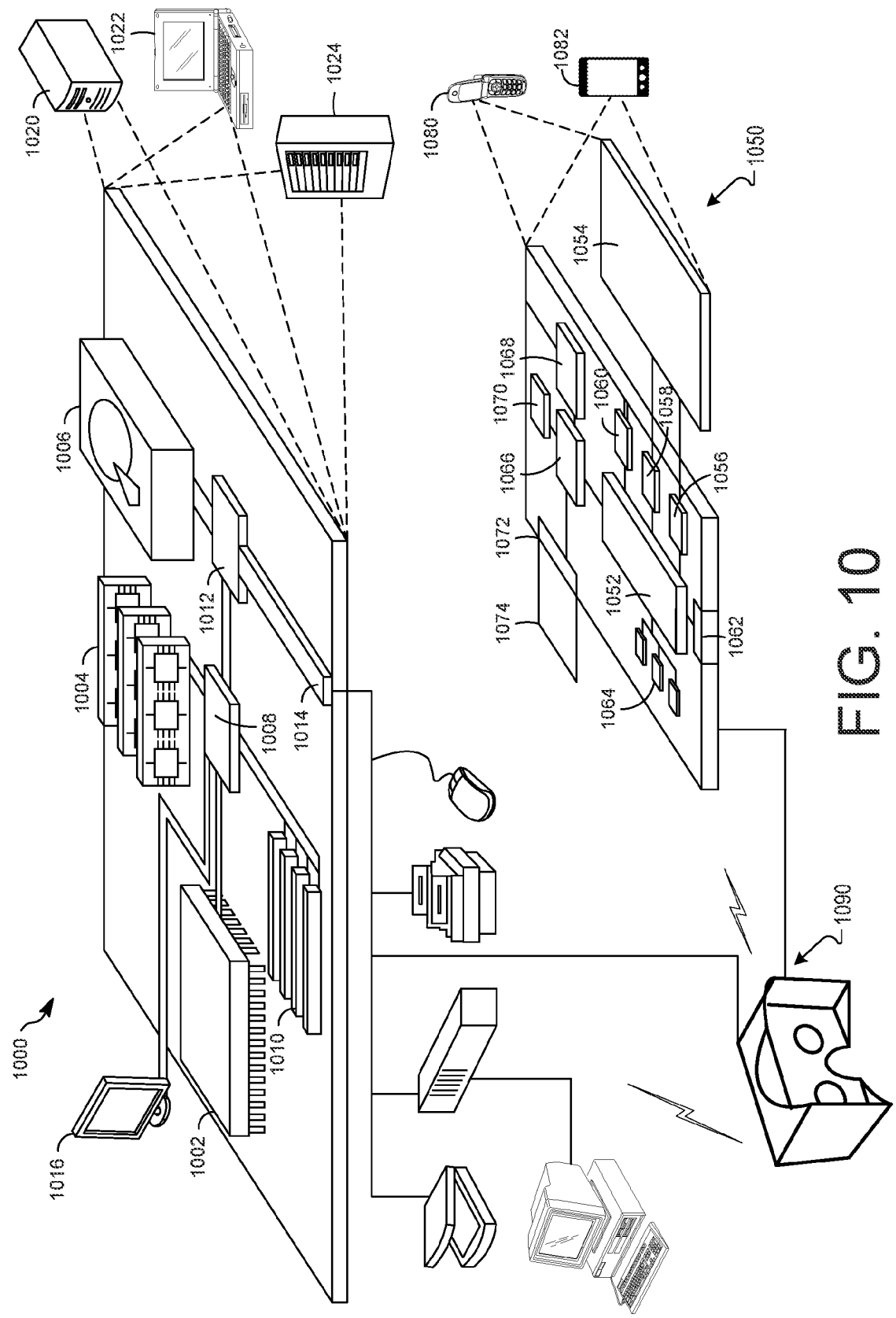
FIG. 10 illustrates example computing devices of the computing systems discussed herein according to an aspect.

FIG. 10 shows an example of an example computer device 1000 and an example mobile computer device 1050, which may be used with the techniques described here. Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. In addition, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing devices 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050 or may also store applications or other information for device 1050. Specifically, expansion memory 1074 may include instructions to carry out or supplement the processes described above and may include secure information also. Thus, for example, expansion memory 1074 may be provided as a security module for device 1050 and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or another similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. In addition, the term "module" may include software and/or hardware.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 10 can include sensors that interface with a virtual reality (VR headset 1090). For example, one or more sensors included on a computing device 1050 or other computing device depicted in FIG. 10, can provide input to VR headset 1090 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the VR space that can then be used as input to the VR space. For example, the computing device 1050 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1050 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the VR space can cause a particular action to occur in the VR space.

In some implementations, a touchscreen of the computing device 1050 can be rendered as a touchpad in VR space. A user can interact with the touchscreen of the computing device 1050. The interactions are rendered, in VR headset 1090 for example, as movements on the rendered touchpad in the VR space. The rendered movements can control objects in the VR space.

In some implementations, one or more output devices included on the computing device 1050 can provide output and/or feedback to a user of the VR headset 1090 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the VR space. In the example of the laser pointer in a VR space, the computing device 1050 appears as a virtual laser pointer in the computer-generated, 3D environment. As the user manipulates the computing device 1050, the user in the VR space sees movement of the laser pointer. The user receives feedback from interactions with the computing device 1050 in the VR space on the computing device 1050 or on the VR headset 1090.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
receiving image data from an image sensor on a user device;
generating first identification data about a first controllable device included in the image data;
determining that a first three-dimensional (3D) map from a map database is annotated with second identification data that corresponds to the first identification data, the map database storing a plurality of 3D maps including the first 3D map and a second 3D map, the first 3D map being associated with the first controllable device, the first 3D map being generated during a configuration process of the first controllable device, the second 3D map being associated with a second controllable device;
comparing the image data to the first 3D map to determine that the first 3D map at least partially corresponds to a physical space represented by the image data;
obtaining a 3D position of the first controllable device in the physical space from the first 3D map; and
rendering a user interface object on a display of the user device in a location that is based on the 3D position of the first controllable device, the user interface object including a control for interacting with the first controllable device.

2. The method of claim 1, wherein the 3D position includes a six degree of freedom position of the first controllable device.

3. The method of claim 1, wherein the first identification data includes information about at least one of a device name or a device type of the first controllable device.

4. The method of claim 1, further comprising:
generating a plurality of feature points about the physical space that includes the first controllable device;
generating the first 3D map based on the plurality of feature points, the first 3D map identifying the 3D position of the first controllable device in the physical space; and
storing the first 3D map in the map database.

5. The method of claim 1, further comprising:
receiving a selection to the control on the user interface object; and
initiating execution of a function on the first controllable device by communicating with the first controllable device.

6. A method comprising:
receiving image data from an image sensor on a user device;
generating identification data about a first controllable device based on the image data, the identification data including information about a classification of a physical space that includes the first controllable device;
identifying, using the identification data, a first three-dimensional (3D) map from a map database that stores a plurality of 3D maps including the first 3D map and a second 3D map, the first 3D map being associated with the first controllable device, the first 3D map being generated during a configuration process of the first controllable device, the second 3D map being associated with a second controllable device;
comparing the image data to the first 3D map to determine that the first 3D map at least partially corresponds to the physical space represented by the image data;
obtaining a 3D position of the first controllable device in the physical space from the first 3D map; and
rendering a user interface object on a display of the user device in a location that is based on the 3D position of the first controllable device, the user interface object including a control for interacting with the first controllable device.

7. A method comprising:
receiving image data from an image sensor on a first user device;
generating identification data about a first controllable device based on the image data;
identifying, using the identification data, a first three-dimensional (3D) map from a map database that stores a plurality of 3D maps including the first 3D map and a second 3D map, the first 3D map being associated with the first controllable device, the second 3D map being associated with a second controllable device;
comparing the image data to the first 3D map to determine that the first 3D map at least partially corresponds to a physical space represented by the image data;
obtaining a 3D position of the first controllable device in the physical space from the first 3D map;
rendering a user interface object on a display of the first user device in a location that is based on the 3D position of the first controllable device, the user interface object including a control for interacting with the first controllable device; and
transmitting an identifier of the first 3D map to a second user device.

8. A non-transitory computer-readable medium storing executable instructions that when executed by at least one processor are configured to cause the at least one processor to execute operations, the operations comprising:
receiving image data from an image sensor on a user device;
generating first identification data about a first controllable device included in the image data;
determining that a first three-dimensional (3D) map from a map database is annotated with second identification data that corresponds to the first identification data, the map database storing a plurality of 3D maps including the first 3D map and a second 3D map, the first 3D map being associated with the first controllable device, the second 3D map being associated with a second controllable device, the first 3D map being generated during a configuration process of the first controllable device, the first and second 3D maps representing different physical spaces;
comparing the image data to the first 3D map to determine that the first 3D map at least partially corresponds to a physical space represented by the image data;
obtaining a 3D position of the first controllable device in the physical space from the first 3D map; and
rendering a user interface object on a display of the user device in a location that is based on the 3D position of the first controllable device, the user interface object including a control for interacting with the first controllable device.

9. The non-transitory computer-readable medium of claim 8, wherein the user interface object displays information about an action of the first controllable device.

10. The non-transitory computer-readable medium of claim 8, wherein the first identification data includes information about at least one of a device name, a device type, or a space type of the physical space that includes the first controllable device.

11. The non-transitory computer-readable medium of claim 8, wherein the user device is a first user device, wherein the operations further comprise:
transmitting an identifier of the first 3D map to a second user device, the second user device configured to use the identifier to join an augment reality (AR) session that includes at least a portion of the physical space.

12. A computing system comprising:
at least one processor; and
a non-transitory computer-readable medium storing executable instructions that cause the at least one processor to:
receive image data from an image sensor;
generate first identification data about a first controllable device included in the image data;

determine that a first three-dimensional (3D) map from a map database is annotated with second identification data that corresponds to the first identification data, the map database storing a plurality of 3D maps including the first 3D map and a second 3D map, the first 3D map being associated with the first controllable device, the second 3D map being associated with a second controllable device, the first 3D map being generated during a configuration process of the first controllable device, the first and second 3D maps representing different physical spaces;

compare the image data to the first 3D map to determine that the first 3D map at least partially corresponds to a physical space represented by the image data;

obtain a 3D position of the first controllable device in the physical space from the first 3D map; and render a user interface object on a display in a location that is based on the 3D position of the first controllable device, the user interface object including a control for interacting with the first controllable device.

13. The computing system of claim 12, wherein the first identification data includes information about a device name and a device type of the first controllable device.

14. The computing system of claim 12, wherein the executable instructions include instructions that cause the at least one processor to:
   generate, during the configuration process of the first controllable device, a plurality of feature points about the physical space that includes the first controllable device;
   generate the first 3D map based on the plurality of feature points, the first 3D map identifying the 3D position of the first controllable device in the physical space; and
   store the first 3D map in the map database.

15. The computing system of claim 12, wherein the executable instructions include instructions that cause the at least one processor to:
   transmit an identifier of the first 3D map to a user device, the user device configured to use the identifier to join an extended reality session that includes at least a portion of the physical space.

16. The computing system of claim 12, wherein the computing system includes a head-mounted display device.

* * * * *